United States Patent
Lapushkin et al.

(10) Patent No.: US 11,621,944 B2
(45) Date of Patent: Apr. 4, 2023

(54) SYSTEMS AND METHODS FOR ANONYMOUS AND CONSISTENT DATA ROUTING IN A CLIENT-SERVER ARCHITECTURE

(71) Applicant: AO Kaspersky Lab, Moscow (RU)

(72) Inventors: Anton S. Lapushkin, Moscow (RU); Dmitry V. Shmoylov, Moscow (RU); Andrey V. Ladikov, Moscow (RU); Andrey A. Efremov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 567 days.

(21) Appl. No.: 16/787,493

(22) Filed: Feb. 11, 2020

(65) Prior Publication Data
US 2020/0412699 A1 Dec. 31, 2020

(30) Foreign Application Priority Data
Jun. 28, 2019 (RU) .......................... RU2019120229

(51) Int. Cl.
| | |
|---|---|
| *H04L 29/06* | (2006.01) |
| *H04L 9/40* | (2022.01) |
| *G06F 16/25* | (2019.01) |
| *G06N 20/00* | (2019.01) |
| *G06F 21/62* | (2013.01) |
| *G06F 16/28* | (2019.01) |

(52) U.S. Cl.
CPC ........ *H04L 63/0421* (2013.01); *G06F 16/258* (2019.01); *G06F 16/285* (2019.01); *G06F 21/6254* (2013.01); *G06N 20/00* (2019.01)

(58) Field of Classification Search
CPC ....... H04L 63/0421; H04L 63/18; H04L 9/40; G06F 16/258; G06F 16/285; G06F 21/6254; G06F 21/60; G06N 20/00
See application file for complete search history.

(56) References Cited

U.S. PATENT DOCUMENTS

| | | | |
|---|---|---|---|
| 8,601,598 B2 | 12/2013 | Ozzie et al. | |
| 8,739,265 B2 | 5/2014 | Ang et al. | |
| 9,319,379 B1* | 4/2016 | Burcham | ................ H04W 8/26 |
| 11,379,416 B1* | 7/2022 | Werr | ..................... G06F 16/113 |
| 2004/0064693 A1* | 4/2004 | Pabla | ..................... G06Q 30/02 |
| | | | 713/168 |

(Continued)

*Primary Examiner* — Mahfuzur Rahman
(74) *Attorney, Agent, or Firm* — ArentFox Schiff LLP; Michael Fainberg

(57) ABSTRACT

Disclosed herein are systems and method for sending user data in a client-server architecture with data anonymity and consistency. In an exemplary aspect, a client device may identify, a structure to send to the server, wherein the structure comprises the user data. The client device may divide the structure into two or more substructures and for each respective substructure of the two or more substructures, the client device may (1) assign a degree of confidentiality to the respective substructure and (2) send the respective substructure to a respective node of a plurality of nodes based on the assigned degree of confidentiality and a degree of security of the respective node. The respective node may be configured to apply a respective transformation to the respective substructure and transmit the transformed respective substructure to the server. The server may be configured to combine received transformed substructures into a transformed structure.

16 Claims, 22 Drawing Sheets

(56) References Cited

U.S. PATENT DOCUMENTS

| | | | |
|---|---|---|---|
| 2004/0098447 A1* | 5/2004 | Verbeke | G06F 9/5055 |
| | | | 709/201 |
| 2004/0148326 A1* | 7/2004 | Nadgir | H04L 67/1057 |
| | | | 709/200 |
| 2014/0195798 A1 | 7/2014 | Brugger et al. | |
| 2016/0134595 A1 | 5/2016 | Lavino | |
| 2017/0091477 A1 | 3/2017 | Peppe et al. | |
| 2017/0243028 A1 | 8/2017 | Lafever et al. | |
| 2018/0350180 A1* | 12/2018 | Onischuk | G07C 13/00 |
| 2019/0306127 A1* | 10/2019 | Efremov | H04L 67/10 |
| 2019/0386969 A1* | 12/2019 | Verzun | H04L 9/0662 |
| 2020/0128036 A1* | 4/2020 | Sarzynski | H04L 63/102 |
| 2020/0259896 A1* | 8/2020 | Sachs | H04L 63/0823 |
| 2020/0358858 A1* | 11/2020 | Shribman | H04L 63/1466 |
| 2020/0412699 A1* | 12/2020 | Lapushkin | H04L 63/0421 |
| 2021/0312552 A1* | 10/2021 | Simpson | H04W 4/029 |
| 2021/0318132 A1* | 10/2021 | Simpson | G06Q 30/0641 |
| 2022/0004308 A1* | 1/2022 | Simpson | G06Q 20/123 |
| 2022/0103525 A1* | 3/2022 | Shribman | G06F 16/955 |
| 2022/0270265 A1* | 8/2022 | Dudovitch | G06T 7/13 |
| 2022/0272078 A1* | 8/2022 | Helfinstine | H04L 63/0478 |

\* cited by examiner

SYSTEMS AND METHODS FOR ANONYMOUS AND CONSISTENT DATA ROUTING IN A CLIENT-SERVER ARCHITECTURE

CROSS-REFERENCE TO RELATED APPLICATION

This application claims benefit of priority under 35 U.S.C. 119(a)-(d) to a Russian Application No. 2019120229 filed on Jun. 28, 2019, which is incorporated by reference herein.

FIELD OF TECHNOLOGY

The present disclosure relates to the field of information technology (IT) security, and more specifically, to methods of assuring anonymity for the routing of data in a client-server architecture.

BACKGROUND

Changes in the law around the world are forcing IT security specialists to seek out new methods for managing data coming from personal electronic devices. For example, in Russia a law exists whereby the personal data of Russians used by online services must be kept within the boundaries of Russia. In an another example, in Switzerland, banks are required to prevent user data from leaving the jurisdiction of the confederation. In fact, in a number of countries, personal data is forbidden to be kept in open form. The solutions being developed should not make the work of the users of computer systems more difficult and should be as transparent as possible to the users in their operation.

With the advent of the General Data Protection Regulation (GDPR), the quantity of personal data being kept in a network infrastructure on the part of various services and being received from users is declining. It is thus necessary to provide a distributed storage and processing of user data without losing its uniqueness.

These principles are causing difficulties in the adoption of a cloud infrastructure in the corporate and private sector, resulting in the appearance on the market of technical solutions which make it possible to take account of the demands of the lawmakers.

On the basis of an analysis of the existing prior art it becomes clear that the known means require the installing of an additional agent on the user's device, which makes it harder for the user to work with the remote server and renders the interaction nontransparent. In another case, when no agent is installed, there is a total encryption of the initial data regardless of the content, which likewise is inconvenient and creates an additional burden. In neither case is due attention given to the location of the client and server. A solution is needed which will be able to solve these shortcomings.

SUMMARY

Aspects of the present disclosure describe methods and systems for sending data in a client-server architecture with anonymity for the data being transmitted and without loss of the completeness and representativeness of the information which is needed by the server for analysis and construction of statistics.

In an exemplary aspect, a client device may identify, a structure to send to the server, wherein the structure comprises the user data. The client device may divide the structure into two or more substructures and for each respective substructure of the two or more substructures, the client device may (1) assign a degree of confidentiality to the respective substructure and (2) send the respective substructure to a respective node of a plurality of nodes based on the assigned degree of confidentiality and a degree of security of the respective node. The respective node may be configured to apply a respective transformation to the respective substructure and transmit the transformed respective substructure to the server. The server may be configured to combine received transformed substructures into a transformed structure.

In some aspects, a first substructure of the two or more substructures comprises information about at least one other substructure of the two or more substructures.

In some aspects, the respective substructure comprises information on a given area of knowledge about a user associated with the client device.

In some aspects, the client device may divide the structure into the two or more substructures by utilizing a clustering model to indicate potential divisions for the structure.

In some aspects, the client device may train the clustering model to output clusters of substructures such that the cluster model, for a given cluster, maximizes a first amount of information about the given area of knowledge about the user and minimizes a second amount of information about other areas of knowledge about the user which are comprised in other substructures of the structure.

In some aspects, the plurality of nodes further comprises the server and the server may further be configured to apply a transformation to the received transformed substructures. In particular, the server may act as one of the nodes with a transformation module if its degree of security meets the requirements.

In some aspects, the plurality of nodes comprises at least one node configured to apply a transformation that transforms the respective substructure such that it is possible to identify a user of the user data from the transformed respective substructure, but it is not possible to retrieve additional data of the user data from the transformed respective substructure.

In some aspects, the plurality of nodes comprises a first node and a second node, and parameters of a first transformation applied by the first node depend on parameters of a second transformation previously applied by the second node.

In some aspects, the degree of confidentiality may represent a numerical value characterizing a probability of identifying a user of the client device from the respective substructure.

In some aspects, the client device may determine the degree of security for the respective node. The degree of security may represent a numerical value characterizing a probability that the respective node is able to provide information security for the respective substructure.

In some aspects, the client device may determine the degree of confidentiality based on a location of the client device.

In some aspects, the client device may send the respective substructure to the respective node based on the location of the client device.

In some aspects, the transformed structure is used to form protected user profiles that represent a functionally interrelated aggregate of the received transformed substructures for a user of the client device.

The above simplified summary of example aspects serves to provide a basic understanding of the present disclosure.

This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for sending user data in a client-server architecture with data anonymity and consistency. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
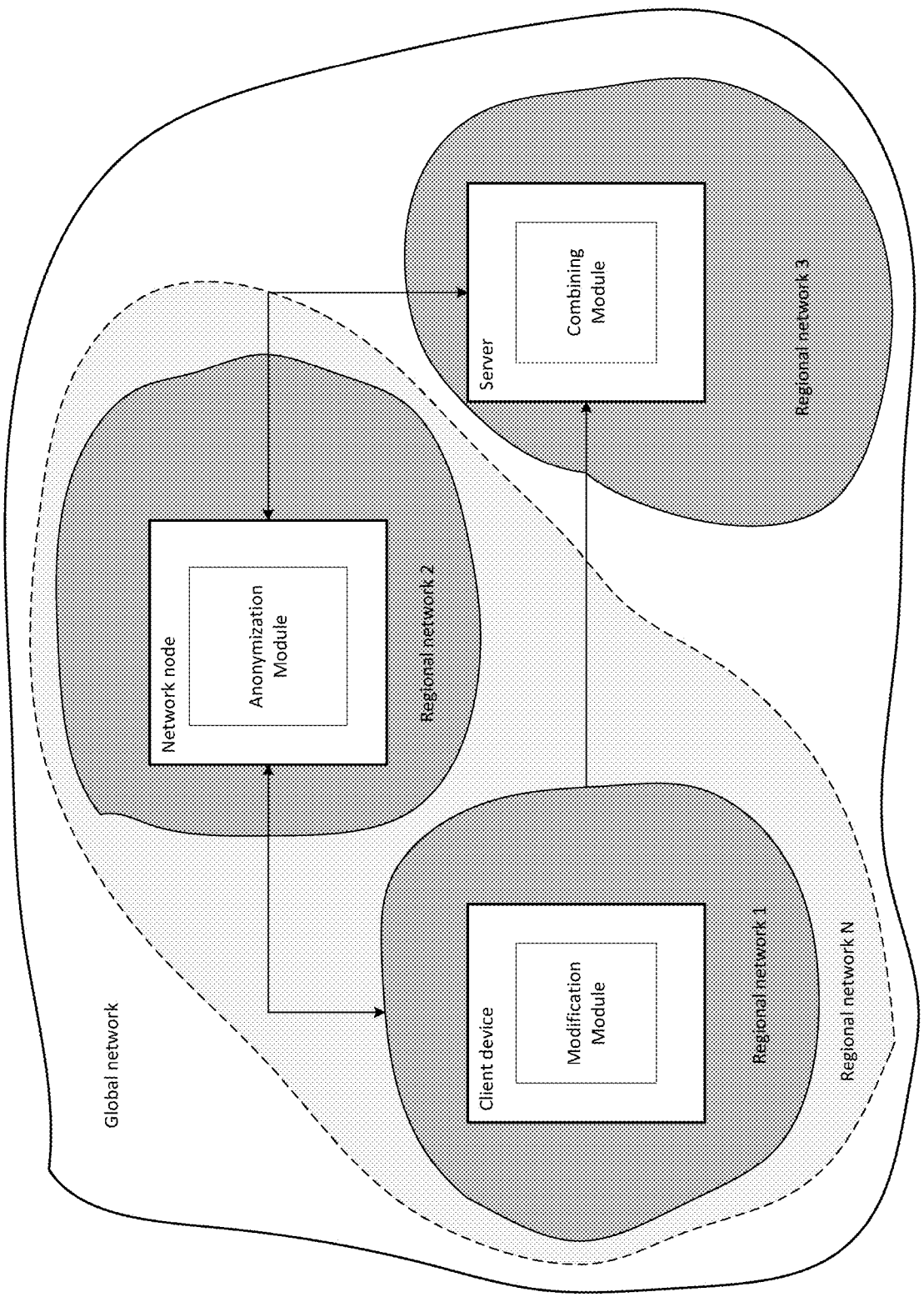
FIG. 1 shows a block diagram of a system for data routing in a client-server architecture, in accordance with aspects of the present disclosure.

The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (e.g., client device, network node, and/or server). Accordingly, each module may be realized in a variety of suitable configurations, and should not be limited to any particular implementation exemplified herein.

FIG. 1 illustrates a system of data routing between client and server. The system includes a client, a server, a network node with anonymization module. The server is part of a cloud infrastructure (not shown in the figure), while the client is a user's device. The node with the anonymization module is situated in a regional network different from the regional network in which the server is situated, and not located in the same Intranet as the server or the client. This allows situating elements of the system in independent jurisdictions. A regional network may be a geographically dispersed network that creates communication links between computers at different points, the aggregate of regional networks forming a global network. In the context of the present disclosure, different regional networks are not only geographically separated, but also are found in different jurisdictions, so that obviously in the context of the present disclosure the different regional networks may also include networks bringing together the nodes of countries (national networks). For example, in FIG. 1, regional network 1 is the network of the USA, regional network 2 is the network of Germany/EC, and regional network 3 is the network of the Russian Federation (RF).

The global network of FIG. 1 is the aggregate of all the regional networks, and may be a network such as the Internet. In the terminology of the GDPR, for example, the regional network of the RF in which the server is situated will be considered to be a regional network of a third party.

In a particular instance, the regional network of the node with the anonymization module is also different from the regional network of the client. The arrows in FIG. 1 start from the network, and not from the client, since in the general case the external IP address is visible thanks to the working of internal address hiding technologies, particularly Proxy, NAT.

The client comprises a modification module, configured to divide the data structures (which are formed for dispatching from the client to the server) into substructures and to select a route for the obtained substructures. There may be various criteria for the division of a data structure into substructures, one such criterion being the presence of personal data (Personal Identification Information) or special categories thereof (in the terminology of the GDPR), whereby the data structure is divided up such that one substructure comprises the personal data (hereinafter, PD, in English: PII) or special categories thereof, another substructure includes data which is not personal data. The assigning of data to the personal data is dictated, for example, by the laws of the country in whose jurisdiction the user of the device, being the client in the system being described, is situated. In other words, the location of the data source. Another more common criterion is the presence of critical data. Critical data is data on which the law or an authorized entity imposes restrictions on its gathering, storage, accessing, dissemination, and processing. This data is generally sensitive to divulging, dissemination, and leakage, since the occurrence of these events will lead to a violation of the rights and the lawfully protected interests of the persons, and liability is enforced against those who permit infractions of the rules for gathering, storing, accessing and processing of such data. A particular instance of critical data is confidential data (used interchangeably with confidential information). Confidential data may be data which is protected in keeping with the legislation of the country in whose jurisdiction the user of the device, which is the client in the system being described, is located. Confidential data in a particular instance includes personal data (PD) and data containing: commercial secrecy, tax secrecy, banking secrecy, medical secrecy, notarial secrecy, attorney secrecy, audit secrecy, communications secrecy, insurance secrecy, last testament secrecy, adoption secrecy, confessional secrecy, investigational secrecy, court proceedings secrecy, information on protected persons and state secrecy.

The anonymization module is configured to apply the transformation and the inverse transformation of the substructures whose route passes through the node with the anonymization module. A transformation may be a function that alters the substructure such as any combination of scaling, quantization, sorting, merging, grouping, data set configuration, table substitution of values and calculated values, data encoding, encryption, and normalization.

Certain kinds of transformation may be applied not only to individual data in the substructure, but also to the substructure as a whole, for example tokenization and/or encryption. In some aspects, a transformation is applied by anonymization module such that there is no possibility to successfully apply an inverse transformation without the anonymization module of the node. An inverse transformation may be a transformation which allows restoration of the original form of an object of transformation (e.g., data, a substructure) prior to the transformation.

A substructure from the same client may be transformed by the anonymization module by the same method or by different methods. If the transformation is carried out by the same method, then the transformed substructure or the data of the substructure from the same client will have an identical appearance; otherwise, they will differ and it will not be possible to construct statistics for the same client (perform a profiling).

The server comprises a combining module, which is configured to combine a data structure that was divided at the client side. The combining may be done, for example, on the basis of unique identifiers, which are assigned to each substructure during the division and are identical for the substructures of the same structure. The combining module receives substructures arriving at the server by various network routes and combines them into a structure. The structure will obviously be different from the original one, divided at the client side, because the substructures passing through the node with the anonymization module will be transformed by that module. The resulting structure may be saved in a database (not shown in the figures) of the server.

In a particular instance, the anonymization module obtains from the client a structure not divided into substructures by the modification module of the client (for example, the structure of a request for the server), in which case the anonymization module for the transmission to the server identifies in the obtained structure the substructures containing PD and performs a transformation of the data of the substructures; examples are given below.

Figure 2:
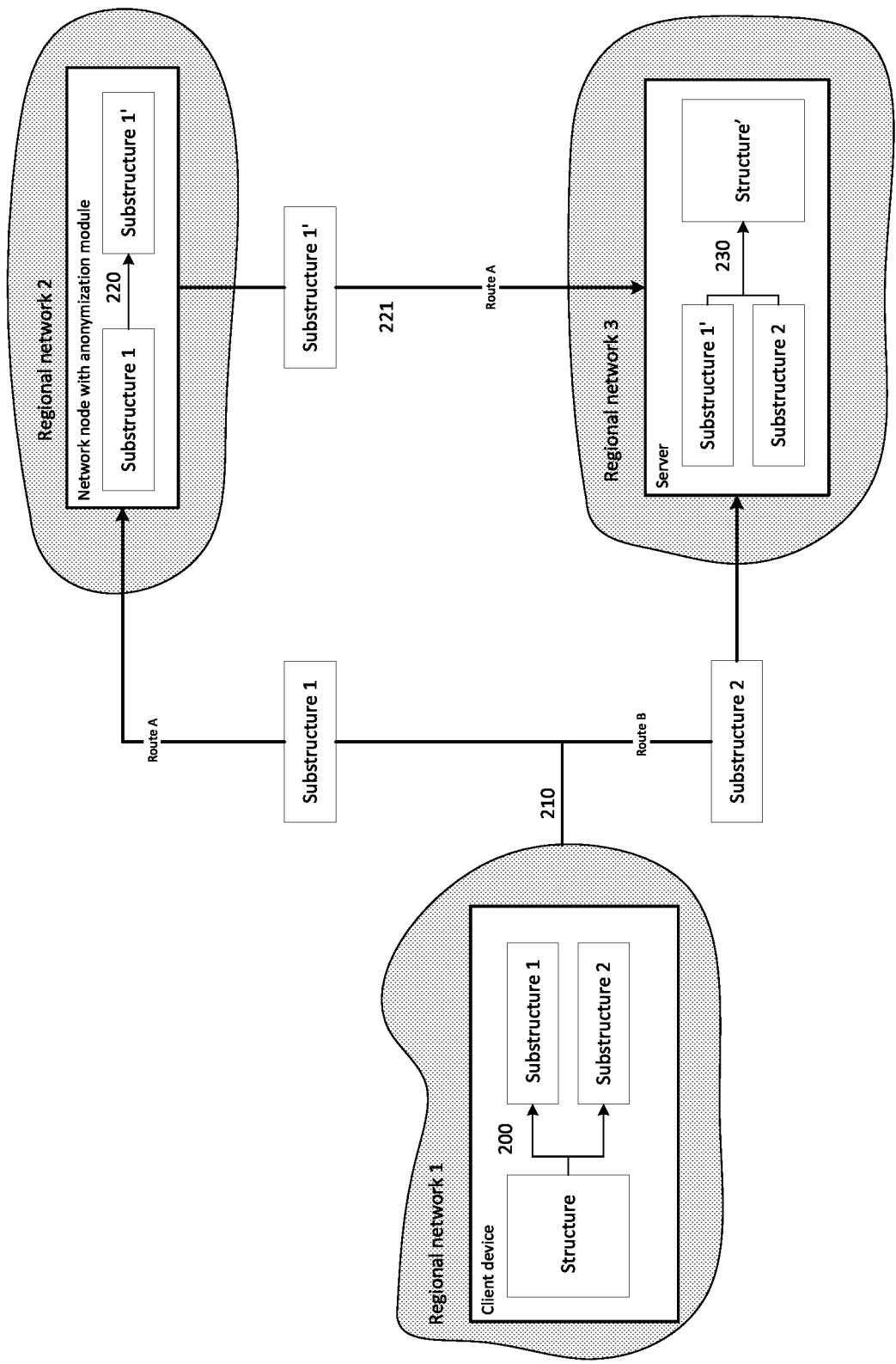
FIG. 2 illustrates a block diagram of a method for data routing in a client-server architecture with division of the data structure into substructures by the client, in accordance with aspects of the present disclosure.

The described system is used for the anonymization of requests being dispatched to the server and responses to these requests being dispatched to the client, and also for obtaining data from clients which is used for the construction of statistics. FIG. 2 shows the method of routing data in a client-server architecture, which is used in a particular instance for the obtaining of data from clients for the construction of statistics. In step 200 the modification module divides the structure intended for dispatching to the server in accordance with criteria, one such criterion being possibly the presence of PD in the structure, and as a result of the division there is obtained a substructure containing PD (in FIG. 2 this is the substructure 1, for example) and one not containing PD (in FIG. 2 this corresponds to substructure 2). Here and below, as the example of the criterion we shall use the presence of PD, and not the presence of critical or confidential data, even though what is valid for PD is also valid for critical or confidential data in general in the exemplary embodiments of the disclosure in the context of the present application. In a particular instance, there may be more than one substructure of the first and second type, as well as more than one criterion by which the division is performed. In step 210 the modification module dispatches the obtained substructures to the server, the dispatching occurring by various routes (route A and route B), where one of the routes includes the network node with the anonymization module (route A), situated in a regional network different from the network where the server is located and not being in the same intranet as the server or the client. When one of the substructures intended for dispatching to the server comprises PD, it will be directed to the server via the node with the anonymization module (route A). Then, in step 220, the substructures passing through the node with the anonymization module are transformed by that module and then sent to the server (step 221) in transformed form. In the general case, the substructures from the same client at different moments of time are transformed differently (for example, Client ID->AnonymizedID1≠AnonymizedID2≠AnonymizedID3 and so on), and this pertains to all the examples, but in a particular case when it is necessary, for certain security systems, to assemble information (construct statistics) on a particular client the transformation will be identical for a substructure from the same client (for example, Client ID->AnonymizedID1=AnonymizedID2=AnonymizedID3 and so on). In conclusion, in step 230 the substructures obtained from the client are combined into a structure (Structure'). Obviously, the resulting structure (Structure') is different from the original one, since at least one substructure has been transformed by the anonymization module. The resulting structure will also be used in the database by an infrastructure module (e.g., depicted as request processing module and attack detection module in other figures) at the server side. The transformation of the substructures and/or data of the substructures by the anonymization module is done by a method preventing the possibility of an inverse transformation of the substructures and/or data of the substructures by any means other than the means of the network node with the anonymization module.

Figure 3:
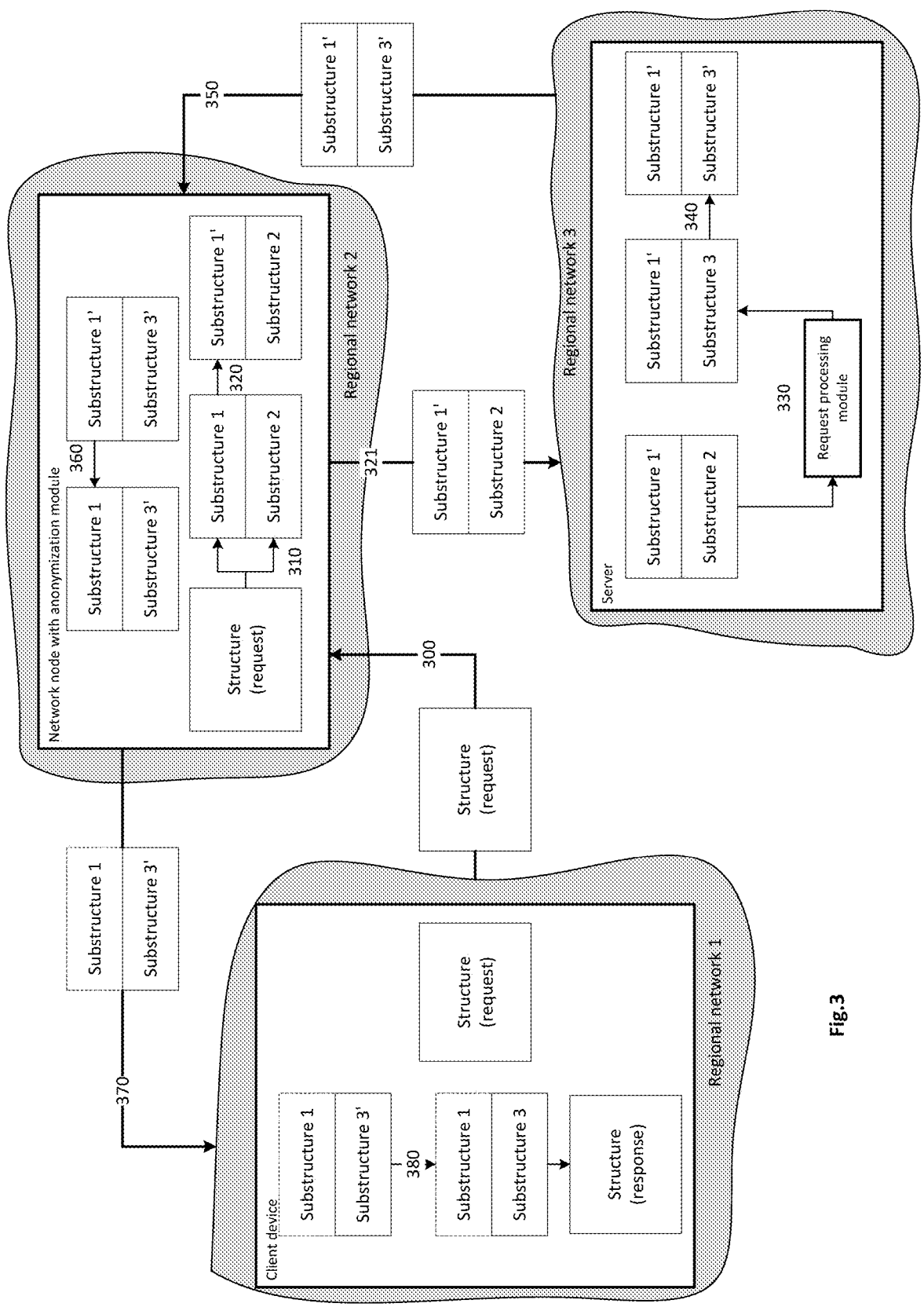
FIG. 3 illustrates a block diagram of a method for data routing in a client-server architecture when executing a request with identification of substructures in the data structure by an anonymization module, in accordance with aspects of the present disclosure.

FIG. 3 shows a routing method which is used, in a particular instance, for executing a request of the client to the server. In step 300 the request generated at the client side is dispatched by the modification module from the client to the server, the route including the network node with the anonymization module situated in a regional network different from the network where the server is located and not being in the same intranet with the server or the client. In a particular instance, some of the request data (not containing confidential data) may be transformed by the modification module at the client side, and the transformation may be carried out such that it is impossible for the anonymization module to perform the inverse transformation (step 311 in FIG. 4) and only the server means can perform the inverse transformation (step 325 in FIG. 4). Such an option may be asymmetrical encryption, where the client has a public key and the server a private key. Next, in step 310, the anonymization module identifies substructures in the data structure of the request intended for dispatching to the server in accordance with criteria, one such criterion possibly being the presence of PD, and obtaining as a result of the identification a substructure containing PD (in FIG. 3, by analogy with the previous example, this is substructure 1) and one not containing PD (in FIG. 3 this is substructure 2). In step 320, the anonymization module performs a transformation (a forward transformation from original to transformed) of the data substructure (and/or the data in the substructure) containing PD, and the anonymization module dispatches the resulting data structure of the request with the transformed substructure containing PD to the server (step 321). In response to the request received, the server in step 330 generates a response by the request processing module. In regard to the data of the request which may have been transformed by the client in a particular instance, the server first performs an inverse transformation (step 325 in FIG. 4). The data structure of the response to the request, in our example with PD, will contain substructures (1) containing PD transformed by the anonymization module (substructure 1', extracted from the request structure) and (2) not containing PD (substructure 3, containing the body of the response to the request or the payload of the response).

The data not containing PD (substructure 3) may be transformed (forward transformation) without the possibility of an inverse transformation by the anonymization module (substructure 3'), this being done in step 340. The inverse transformation of this data may only be performed by the modification module of the client. In step 350, the resulting data structure of the response to the request is dispatched from the server to the network node with the anonymization module. The anonymization module in step 360 performs the inverse transformation of the data substructures of the response to the request containing PD (substructure 1'). The inverse transformation is done with respect to the data which was transformed in step 320 (inverse transformation from transformed data to original data contained initially in the request from the client). The obtained data structure is redirected to the client (step 370) and the modification module of the client in step 380 performs the inverse transformation of the data substructures of the response to the request not containing PD that were transformed by the server in step 340.

Figure 4:
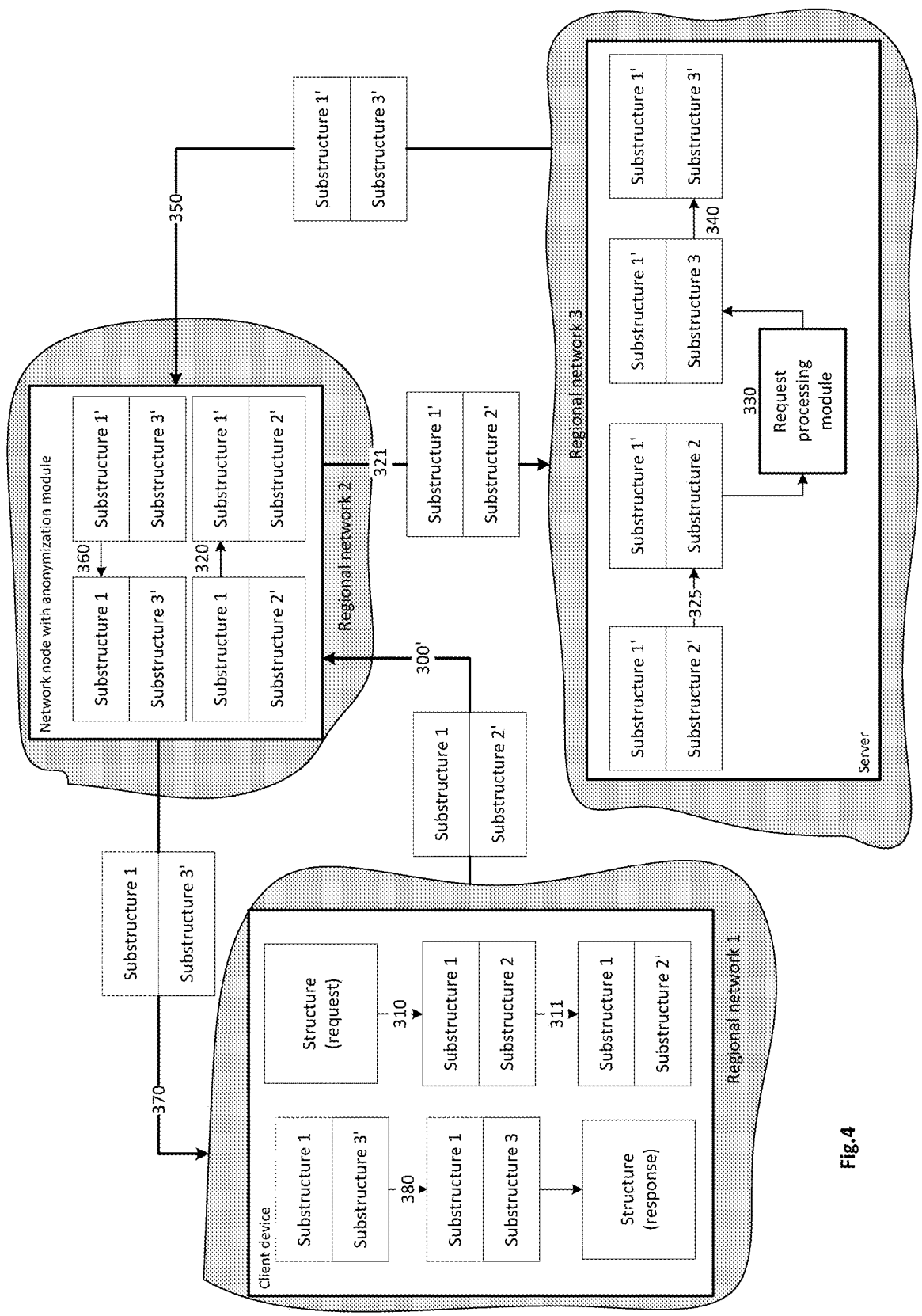
FIG. 4 illustrates a block diagram of a method for data routing in a client-server architecture with identification of substructures in the data structure by the client, in accordance with aspects of the present disclosure.

FIG. 4 shows a variant of the method shown in FIG. 3, but in this variant step 310 after identifying the substructures is carried out not by the anonymization module, but by the modification module of the client, followed by transformation of the substructure in step 311. By analogy with the variant in FIG. 3, the substructure not containing PD (substructure 2) is subjected to the transformation. Therefore, step 300' in FIG. 4 differs from the analogous step 300 of the method in FIG. 3 in that it is not the original data structure of the request which is sent to the node with the anonymization module, but rather the transformed structure after performing steps 310 and 311. Accordingly, in this variant, step 325 is added, where there is performed at first an inverse transformation of the substructure (in our example, substructure 2', not containing PD) that was transformed in step 311, before carrying out step 330.

Figure 5:
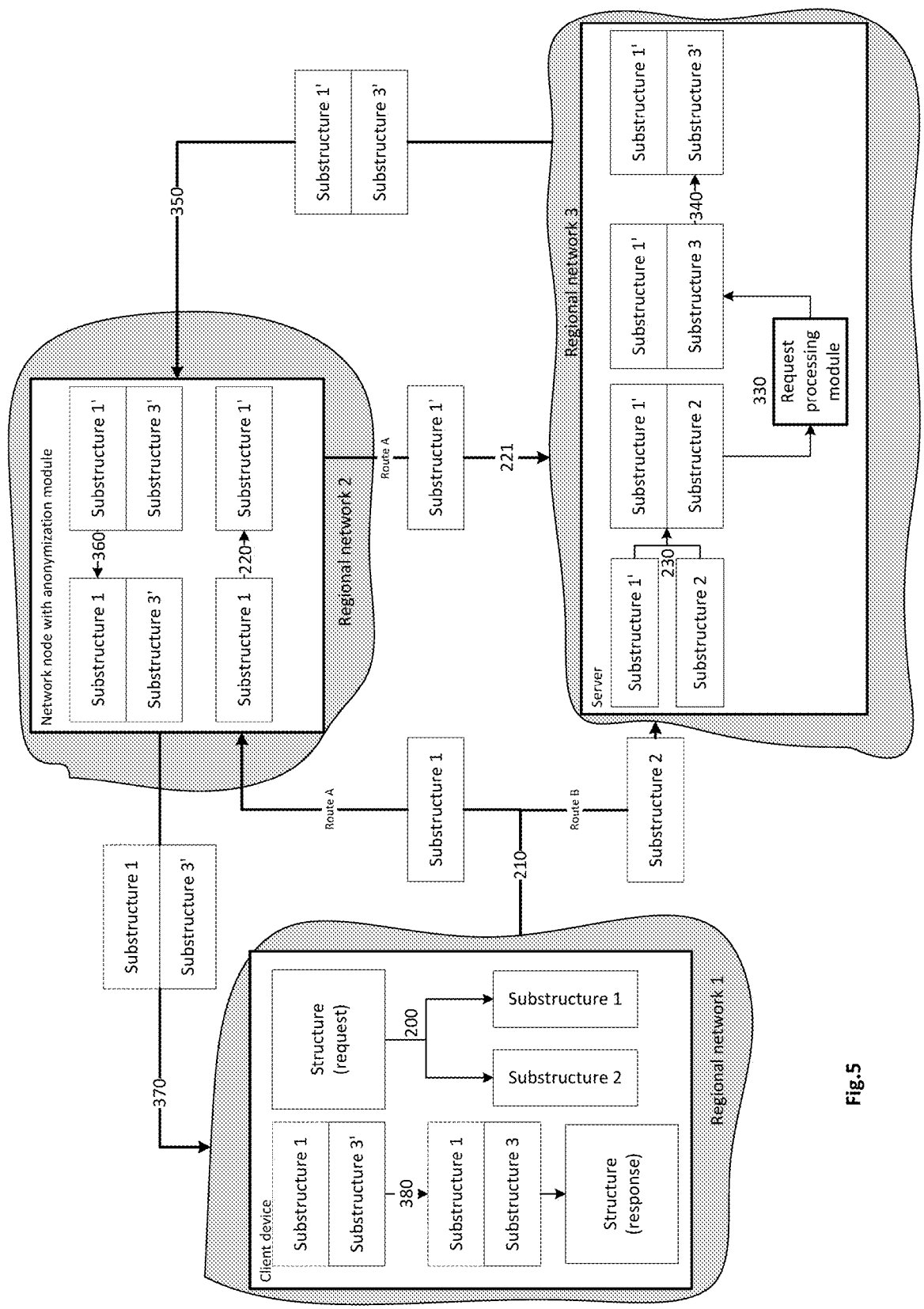
FIG. 5 illustrates a block diagram of a method for data routing in a client-server architecture when executing a request with division of the data structure into substructures by the client, in accordance with aspects of the present disclosure.

FIG. 5 shows a variant of the method of data routing in a client-server architecture in which steps 200 to 230 are analogous to the steps of the method shown in FIG. 2, while steps 300 to 380 are analogous to the steps of the method shown in FIG. 3. In a particular case, the substructure 2 before being dispatched directly to the server might be first transformed, by analogy with step 311 in FIG. 4, and then step 325 is added in the diagram of the method, beside step 311.

In a particular instance, in all embodiments of the method shown in FIG. 3-FIG. 5 the data structure dispatched to the client by the node with the anonymization module in step 370 does not contain a data substructure with PD (in our examples, substructure 1). That substructure needs to be saved until this step, in order to determine the addressee of the response; after this, there is no need for it in a particular instance.

Figure 6A:
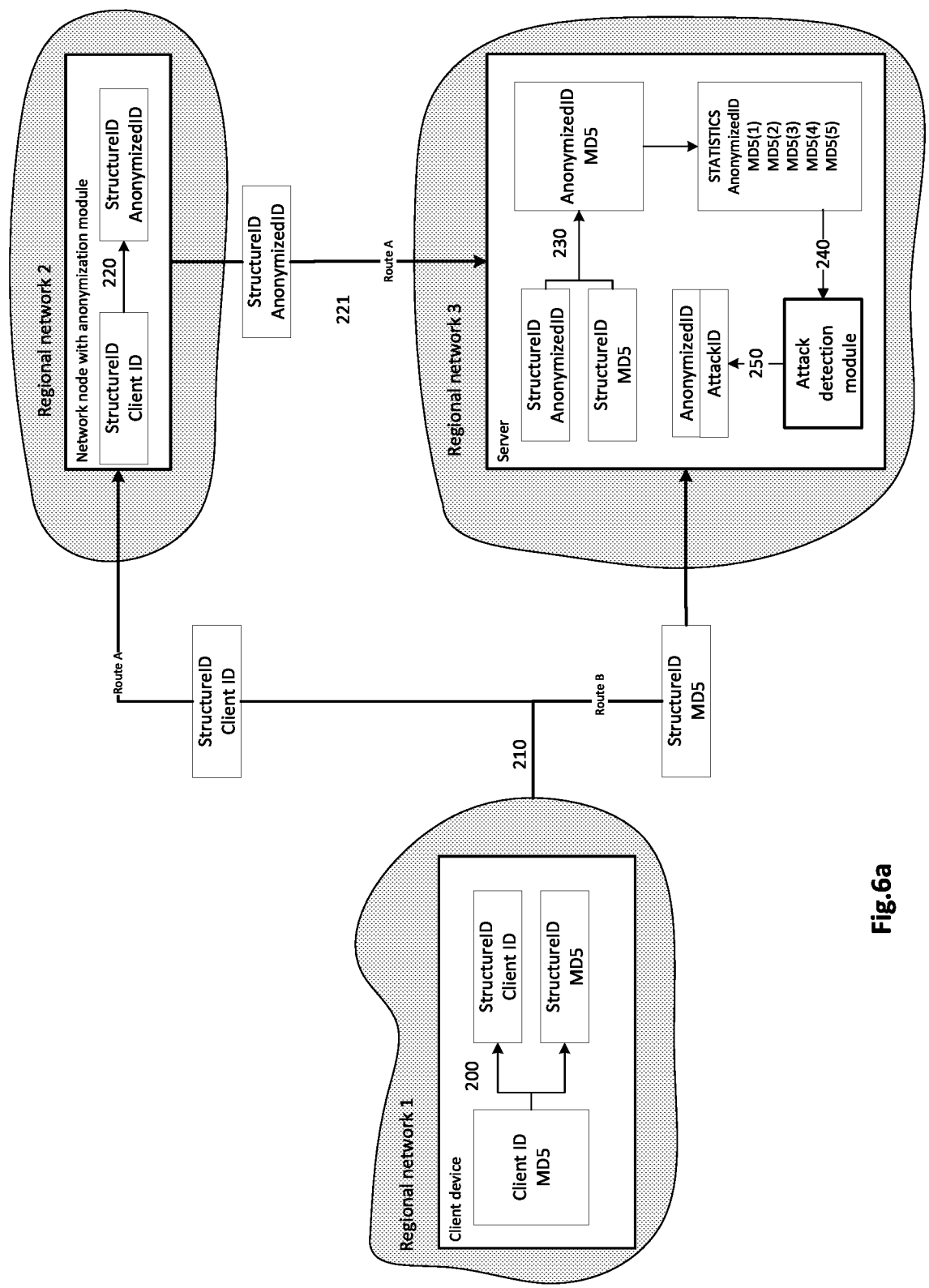
FIG. 6a illustrates a block diagram of a method for data routing in a client-server architecture when sending data (for the construction of statistics) with division of the data structure into substructures by the client, in accordance with aspects of the present disclosure.

FIG. 6a shows an example of the working of the method shown in FIG. 2. The device with the client is connected to a system for remote detecting of targeted attacks, located on the server side, and therefore it is necessary to: obtain information from the client as to files with malicious code (malicious files) detected at various times and to construct statistics on the basis of the information obtained (often in compliance with the national legislation on personal data this still needs to be done anonymously). Upon detecting several such malicious files a conclusion is made at the server side that a targeted attack on the client has been detected.

For the dispatching to the server of the information on the detected malicious file (in the present example, the information about the file is the MD5 of the file), a data structure is generated which includes the ID of the client and the MD5 of the detected malicious file. In step 200 the modification module divides the generated structure intended for dispatching to the server into substructures, obtaining as a result of the division a substructure containing the ID of the client and a substructure containing the MD5 of the file; in order to know to which structure the substructures pertain, they are assigned an identifier (in the figure the identifier is denoted as StructureID). In step 210 the modification module of the client dispatches the obtained substructures to the server, the dispatching occurring by different routes (route A and route B), where one of the routes (route A) includes a network node with the anonymization module, situated in a regional network different from the network where the server is located, and not being in the same intranet with the server or the client. The substructure containing the client ID is directed to the server across the node with the anonymization module (route A). In step 220 the anonymization module performs the transformation of the client ID, where the client ID is saved at the node, and replaces it in the substructure with the token AnonymizedID (in a particular instance, the Client ID may be encrypted). The obtained substructure is dispatched to the server (step 221). In conclusion, in step 230 the substructures received from the client are combined into a structure. Obviously, the resulting structure differs from the original one, since at least one substructure was transformed by the anonymization module. The resulting structure is saved at the server (or in any given database of the infrastructure to which the server belongs) and will be used by the server to assemble information (denoted in the figure as STATISTICS) on the client from whom the structure was obtained. In step 240 the assembled information will be used by the attack detection module and if the module detects an attack then in step 250 the module will generate a structure containing a substructure with the AnonymizedID and a substructure containing information on the attack (denoted in the figure as AttackID); the obtained structure will be addressed to the client to give notice of the attack.

Figure 6B:
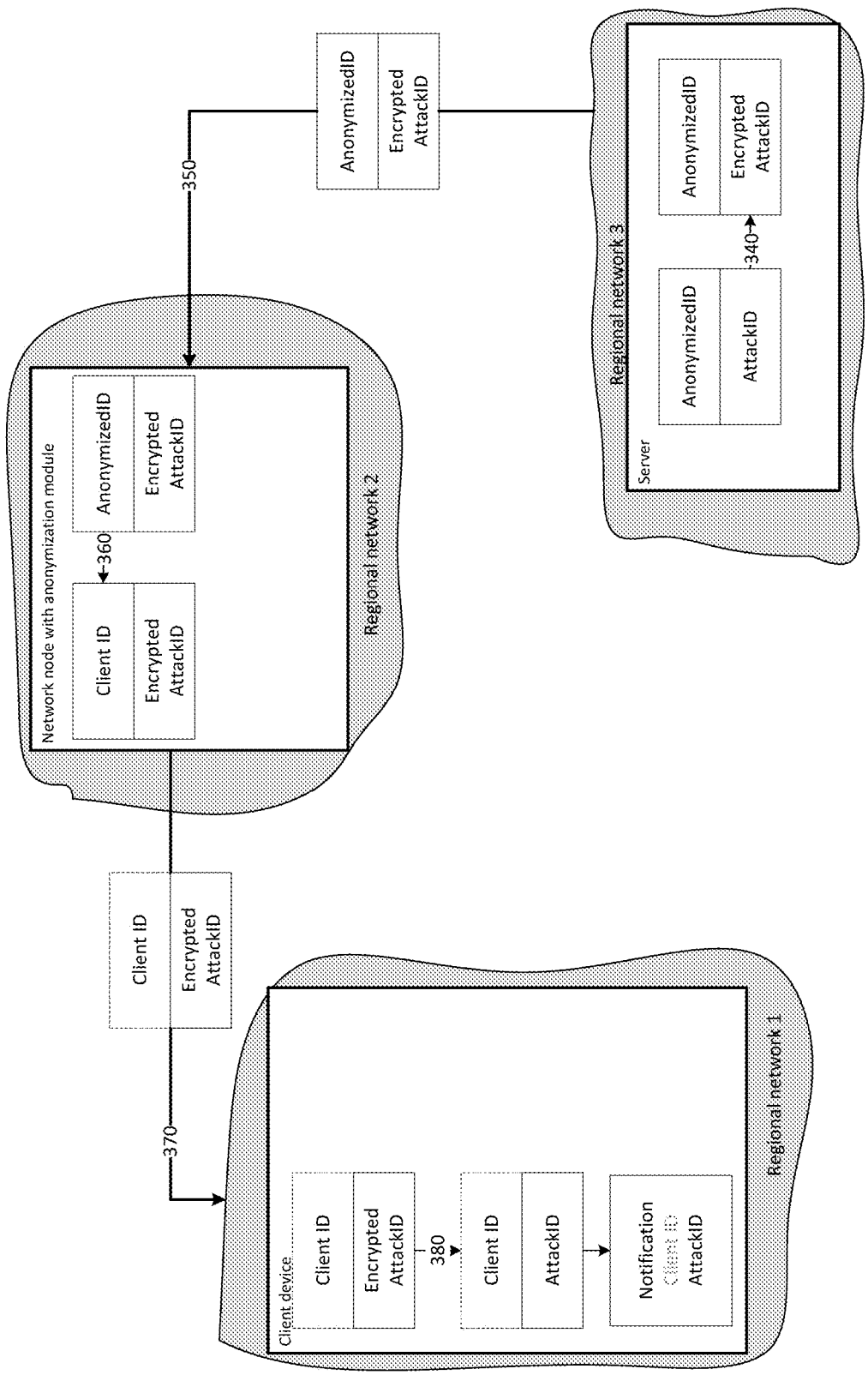
FIG. 6b illustrates a block diagram of a method for data routing in a client-server architecture upon detecting a targeted attack on the client based on information gathered by the method of FIG. 6a, in accordance with aspects of the present disclosure.
Figure 8:
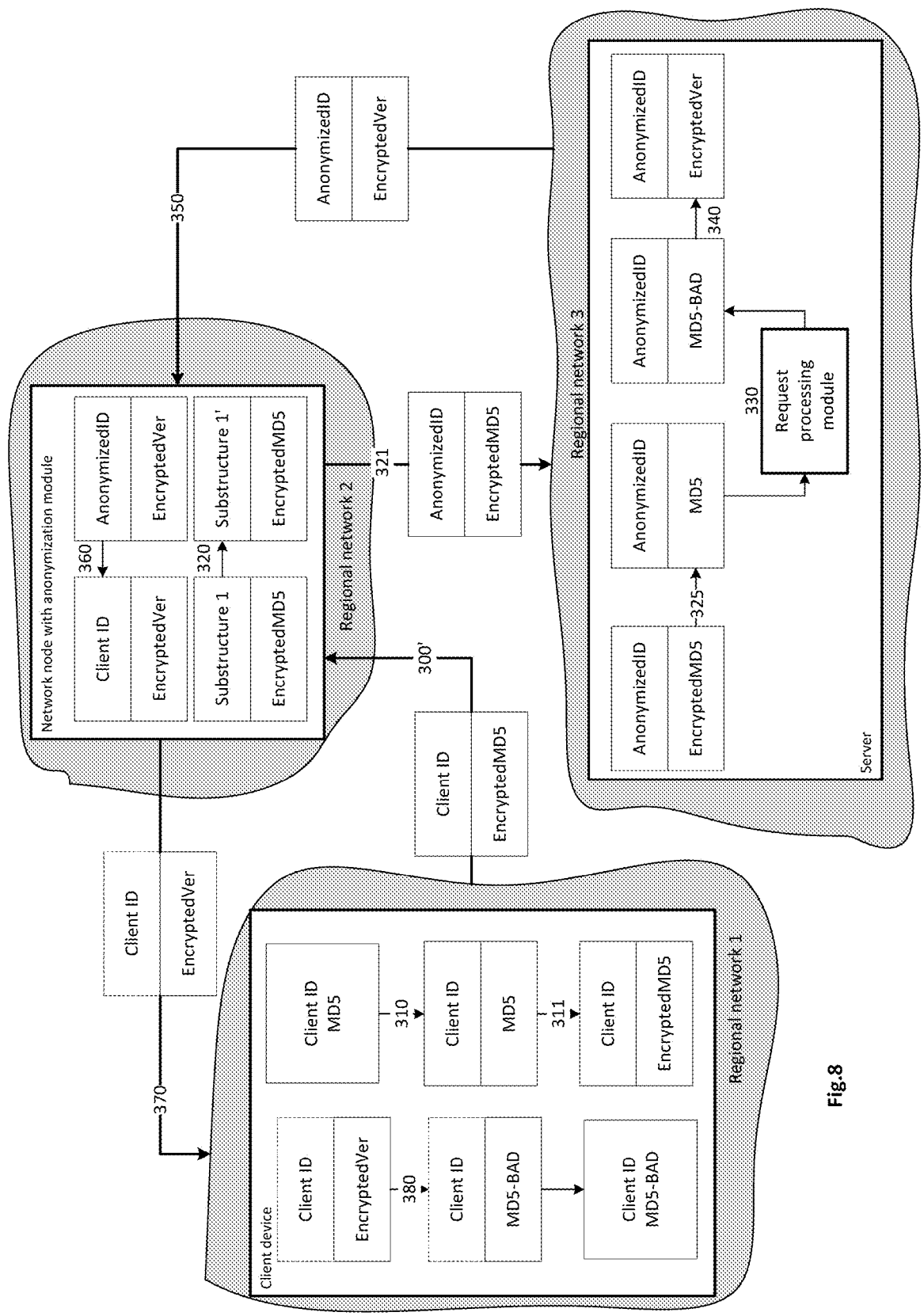
FIG. 8 illustrates a block diagram of a method for data routing in a client-server architecture with identification of substructures in the data structure by the client, in accordance with aspects of the present disclosure.

An example of the method of dispatching is shown in FIG. 6b, steps 340 to 380 being analogous to the steps of the example shown in FIG. 8. In a particular instance, information about the attack might not be transformed, but rather be dispatched in open form; in that case, the example will lack the steps 340 and 380.

Figure 7:
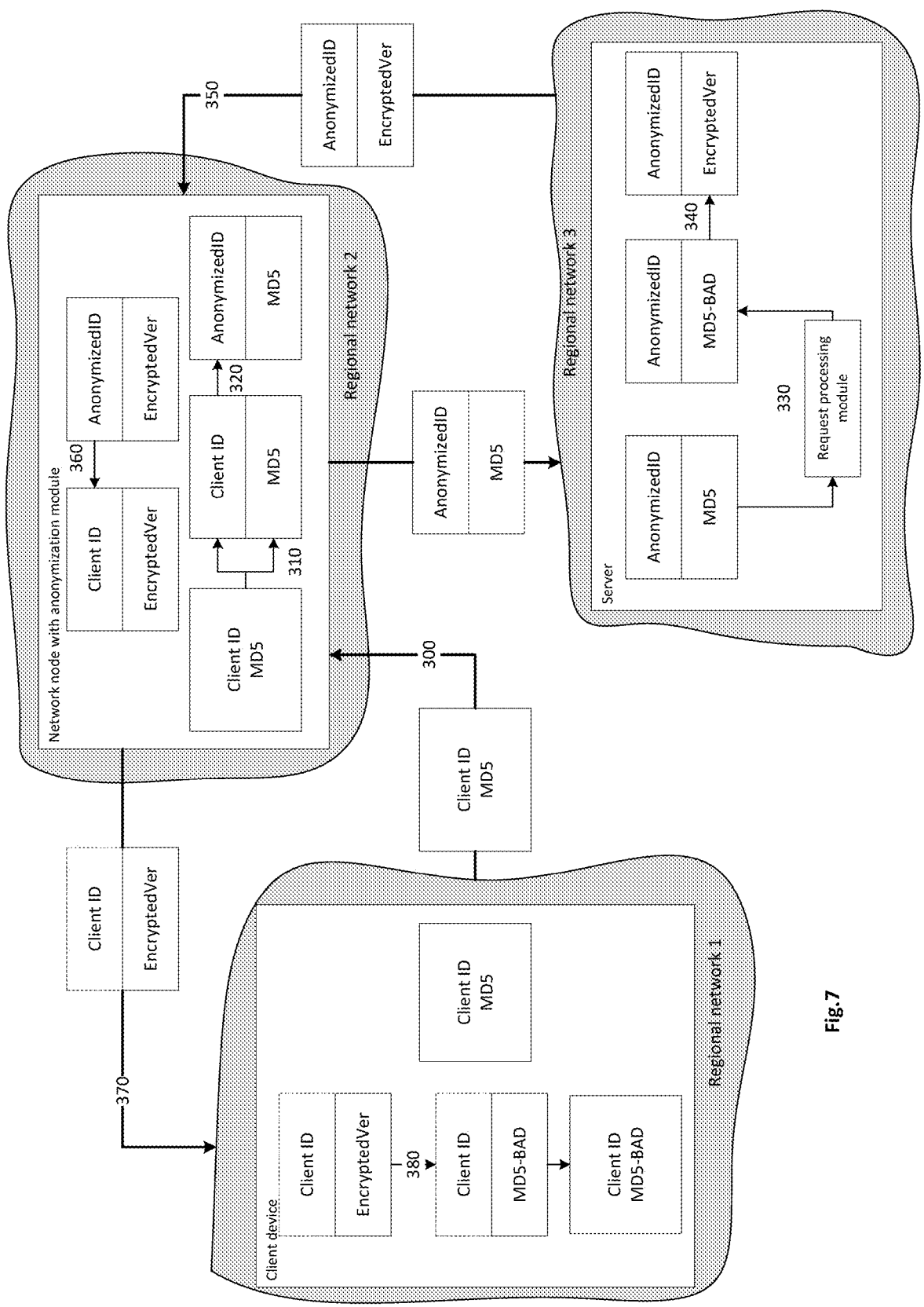
FIG. 7 illustrates a block diagram of a method for data routing in a client-server architecture when executing a request with identification of substructures in the data structure by the anonymization module, in accordance with aspects of the present disclosure.

FIG. 7 shows another example of the working of the described disclosure. A new file has been discovered on the device with the client, and this needs to be scanned for the presence of malicious code by the server means. For this, it is necessary to dispatch information about the file to the server, in the present example this being the MD5 of the file, for which the client generates a request structure. For the purpose of telling the server to whom the response should be dispatched, there is inserted in the data structure of the request a client ID, so that the data structure of the request includes the client ID and the MD5 of the file. In step 300 the request generated at the client side is dispatched by the modification module to the server, the route including the network node with the anonymization module, situated in a regional network different from the network where the server is located, and not being in the same intranet with the server or the client. Next, in step 310, the anonymization module identifies substructures in the structure intended for dispatching to the server, obtaining as a result of the identification a substructure containing the client ID and a substructure containing the MD5 of the file. In step 320, the anonymization module performs a transformation of the client ID, where the client ID is saved at the node, and this is replaced in the substructure by the token AnonymizedID (in a particular instance, the client ID may be encrypted). The obtained data structure of the request with the transformed substructure is dispatched to the server (step 321). A response to the request received is generated in step 330 by the request processing module of the server. The request processing module extracts from the structure the MD5 of the file and issues a verdict, for example, BAD (the file is malicious). The data structure of the response to the request will contain substructures: (1) containing the token AnonymizedID (or the client ID encrypted by the anonymization module) and (2) containing a verdict for the file (MD5-BAD).

The verdict in step 340 is transformed by the server means without the possibility of an inverse transformation by the anonymization module, for example by encrypting it with a public key (the transformed verdict is denoted in the figure as EncryptedVer), the private key being kept at the client side, and the inverse transformation may only be performed by the modification module of the client. In step 350 the obtained data structure of the response to the request is dispatched from the server to the network node with the anonymization module. The anonymization module in step 360 performs the inverse transformation of the data substructure of the response to the request containing the token AnonymizedID by the anonymization module, where in the case of a token the token is replaced by the previously saved client ID, and in the case when the client ID was encrypted it is then decrypted. Thus, the transformation is performed with regard to the data which was transformed in step 320. The obtained data structure is redirected to the client (step 370) and the modification module of the client in step 380 performs the inverse transformation of the verdict transformed by the server in step 340, in our example, it is decrypted with the aid of the private key. In a particular instance, AnonymizedID for the same Client ID, but they will be different in different dispatches.

FIG. 8 shows a variant of the example shown in FIG. 7, in this variant the step 310 after identification of the substructures is performed not by the anonymization module, but by the modification module of the client with later transformation of the substructure saving information about the file (the MD5 of the file) by encryption with the public key (in the figure the transformed information about the file is denoted as EncryptedMD5); the private key is kept at the server side and the inverse transformation may be performed only at the server side. Thus, step 300' of the example in FIG. 8 differs from the analogous step of the example in FIG. 7 in that it is not the original structure of the request which is sent to the node with the anonymization module, but rather the transformed one, after performing steps 310 and 311. Accordingly, therefore, step 325 is added, where prior to performing step 330 an inverse transformation is done for the encrypted information about the file by decrypting it with the aid of the private key.

Figure 9:
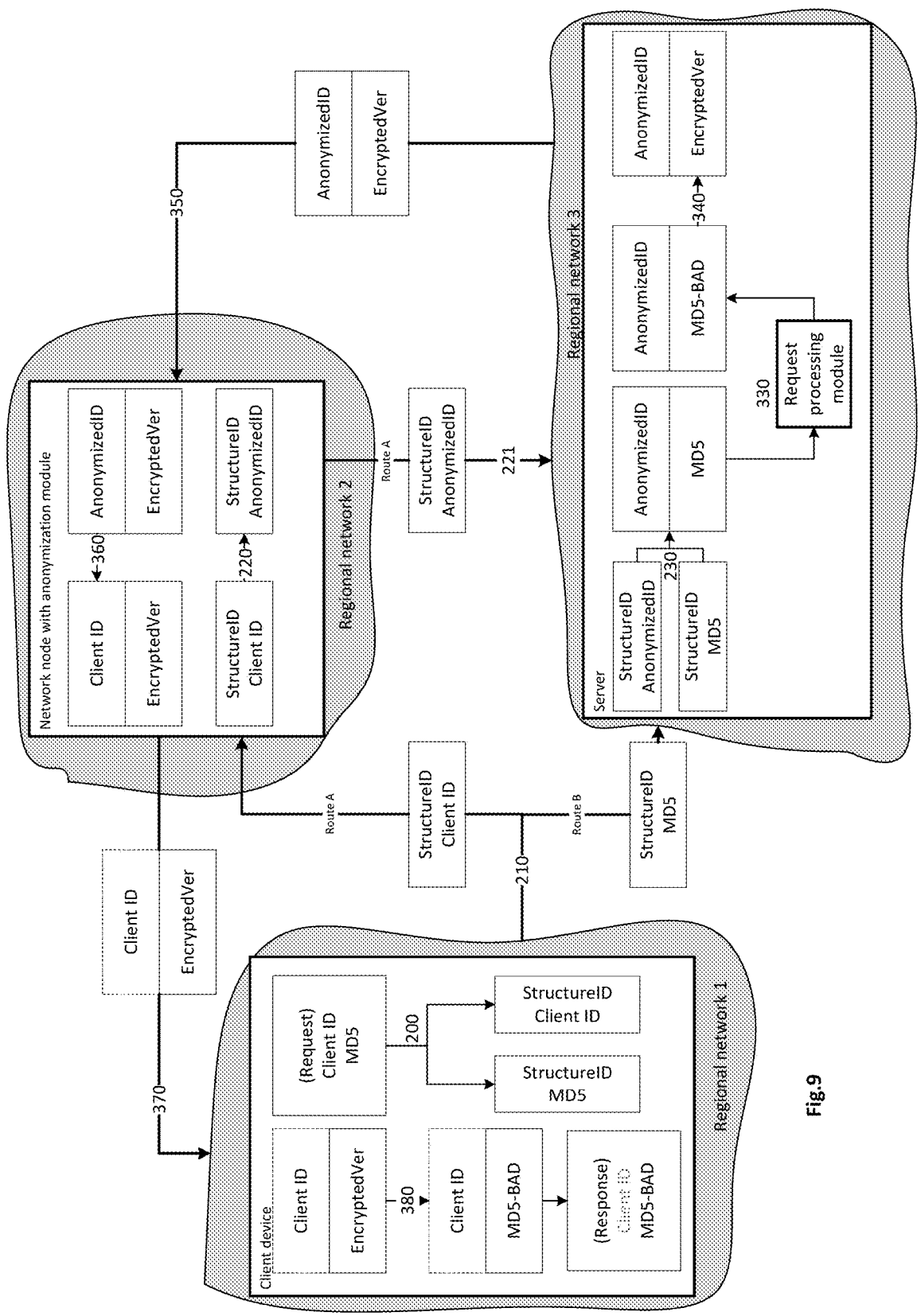
FIG. 9 illustrates a block diagram of a method for data routing in a client-server architecture when executing a request with division of the data structure into substructures by the client, in accordance with aspects of the present disclosure.

FIG. 9 shows an example of data routing in a client-server architecture in which steps 200 to 230 are analogous to the steps of the example shown in FIG. 6a, while steps 330 to 380 are analogous to the steps of the example shown in FIG. 7. In a particular instance, the information about the file may first be transformed prior to being dispatched directly to the server, by analogy with step 311 in the example of FIG. 8, so that step 325 is added in the example, beside step 311.

The modification module of the client intercepts the structures intended for dispatching to the server, divides these structures in accordance with established rules, and selects routes for these substructures also in accordance with rules. The rules by which the modification module functions are established in a particular instance by the existing legislation of the state in whose jurisdiction the device with the client (the source) is operating. Therefore, in order to apply the rules the modification module of the client determines the location of the device (source), the type of data in the generated structure, the purpose of the structure (e.g., dispatching of data to the server for construction of statistics at the server side), the location of the data recipient, and on this basis in accordance with the rules it selects the route for the data, the division variant, and the method of transformation at the client side. One variant of formalized rules is presented in Table 1, where the method is:

1—dividing of the structure at the client side (see FIG. 2);
2—identification of the structure at the node with the anonymization module (see FIG. 3);
3—identification of the structure at the client side (see FIG. 4).

As indicated above, the rules may be dictated by the requirements of legislation (such as the GDPR) and just as any given legal norm includes a hypothesis and a disposition, so too in algorithmic language there is a corresponding "if—then" construction. Thus, the table formalizes a rule of the kind:

IF [type, source, recipient, personal data (yes/no)]

THEN [method, location of anonymization node, method of transformation for the data]

For example, the type of send is a request, the source (client) is Germany, the recipient (server) is the RF, and the structure comprises personal data. In accordance with the rules, the modification module must identify the substructure with PD at the client side (as in step 310 of FIG. 4—method 2) and dispatch it via the USA, encrypt the substructure without PD with the public key (as in step 311 of FIG. 4), and transform the personal data by the anonymization module using encryption.

TABLE 1

Rules for the modification module

| | Rule hypothesis (if) | | | | | Rule disposition (then) Output | | | | |
| --- | --- | --- | --- | --- | --- | --- | --- | --- | --- | --- |
| | | | | | | Routing | | Transformation | | |
| | | Input | | | | Node with anonymization module in | | PD | | Encryption |
| | Type | Source/recipient | | | Method | regional | | | | |
| No | Request Statistics | Client | Server | ΠPD | 1 2 3 | network | Encryption | Tokenization | of non-PD |
| 1 | + | USA | RF | + | + | USA | | + | + |
| 2 | + | | | + | + | Germany | + | | |
| 3 | + | Germany | RF | + | + | Germany | | + | + |
| 4 | + | | | + | + | USA | + | | |

Figure 10:
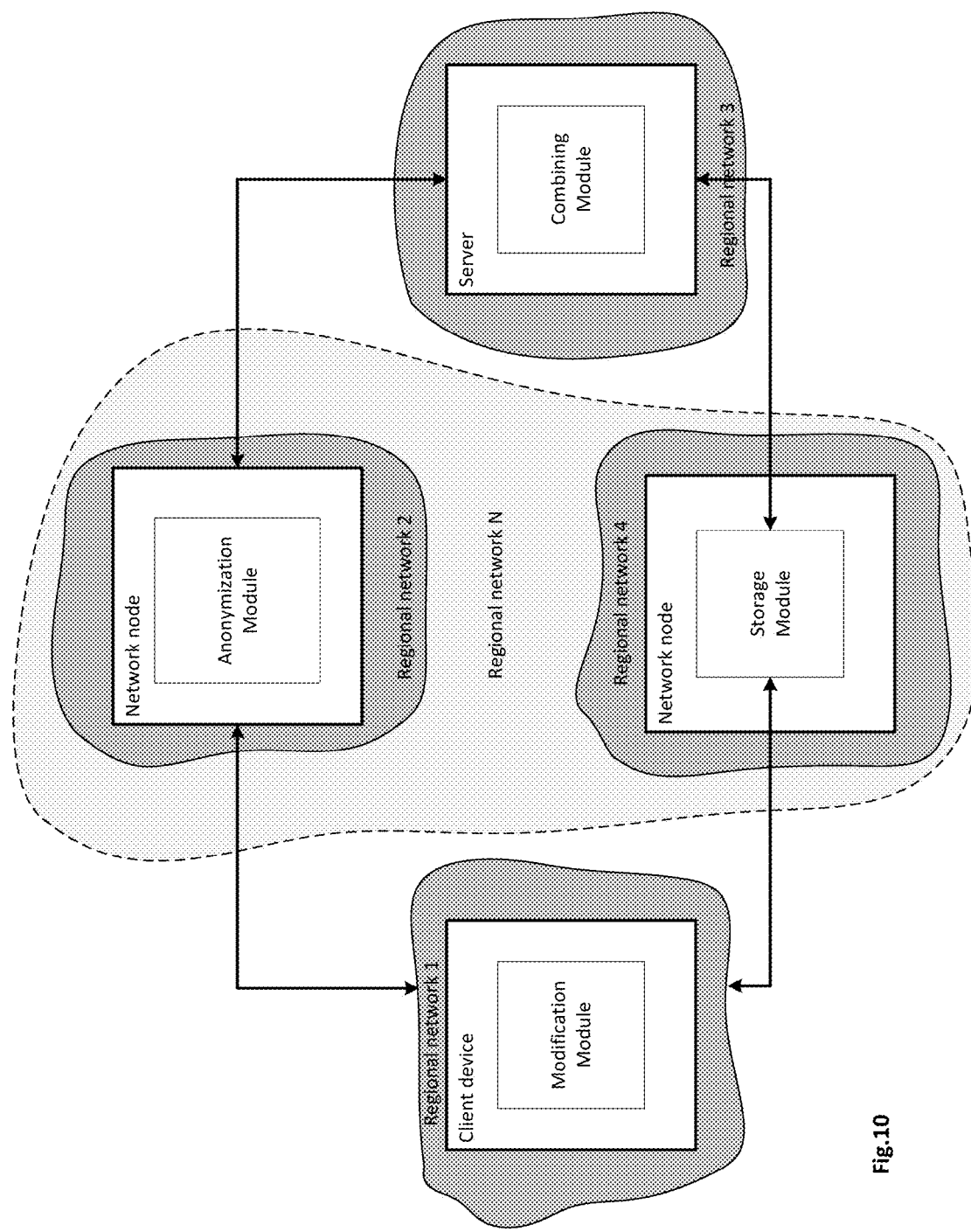
FIG. 10 shows a block diagram of a system for anonymous data exchange in a client-server architecture, in accordance with aspects of the present disclosure.

In another variant embodiment, to the system shown in FIG. 1 there is added a network node with a storage module, the system with that node is shown in FIG. 10. The network node with the storage module is situated in a regional network different from the regional network in which the server is located and is not in the same intranet as the server or the client. In a particular instance, the network node with the storage module may be in the same regional network as the network node with the anonymization module, such as the network in FIG. 10 indicated as regional network N. The purpose of the network node with the storage module is to hide the external IP address of the client from the server and relieve the burden of the node where the anonymization module is located, so that the volume of traffic passing through the node with the anonymization module is reduced. The network node with the storage module is an intermediate repository for data being exchanged by the client with the server, a common analog of such a node is the subscriber's box (post office box).

Figure 11:
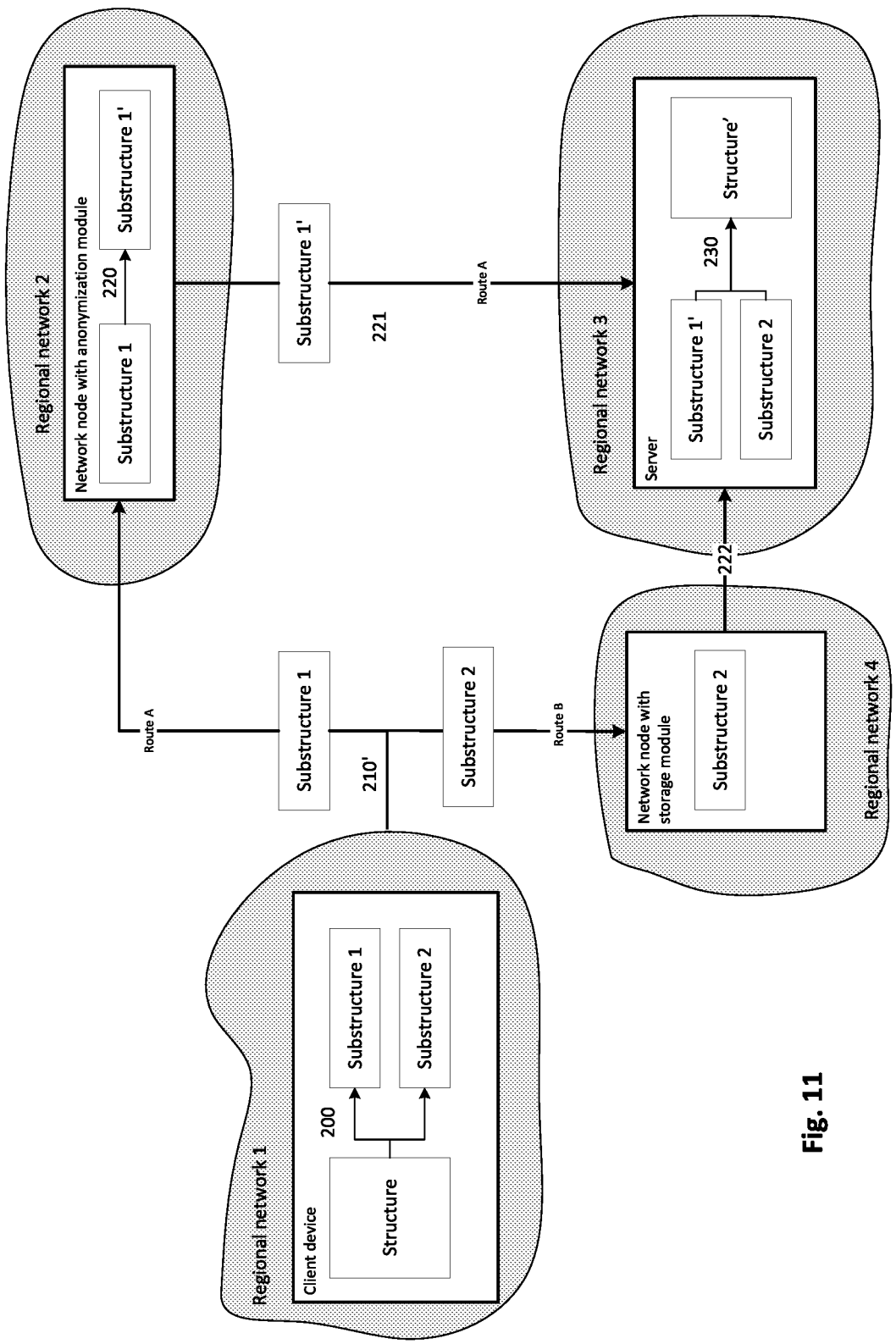
FIG. 11 illustrates a block diagram of a method for data exchange in a client-server architecture which is used to obtain data from clients for constructing statistics on the server side, in accordance with aspects of the present disclosure.

The system shown in FIG. 10 is used for the anonymous exchange of data between a client and a server, including for the sending of data from clients which is used to construct statistics and for client-server interaction of the "request-response" type. FIG. 11 shows the method of anonymous exchange of data between a client and a server, which in a particular instance is used to obtain data from clients for the construction of statistics on the server side. The steps 200, 221, 220, 230 are analogous to the steps shown in FIG. 2. Step 210' differs from the analogous one and step 222 is added. In FIG. 2 route B went directly from client to server, but in the embodiment being described this route is broken up, and the client dispatches substructure 2 not to the server, but to the node with the storage module. Then, in step 222 this substructure will be received by the server. The initiator of the sending of this substructure to the server in step 222 may be either the node with the storage module or the server, which downloads the substructure 2 on demand when it receives via route A the substructure 1' with the identifier of substructure 2 that was saved by the network node with the storage module.

Figure 12:
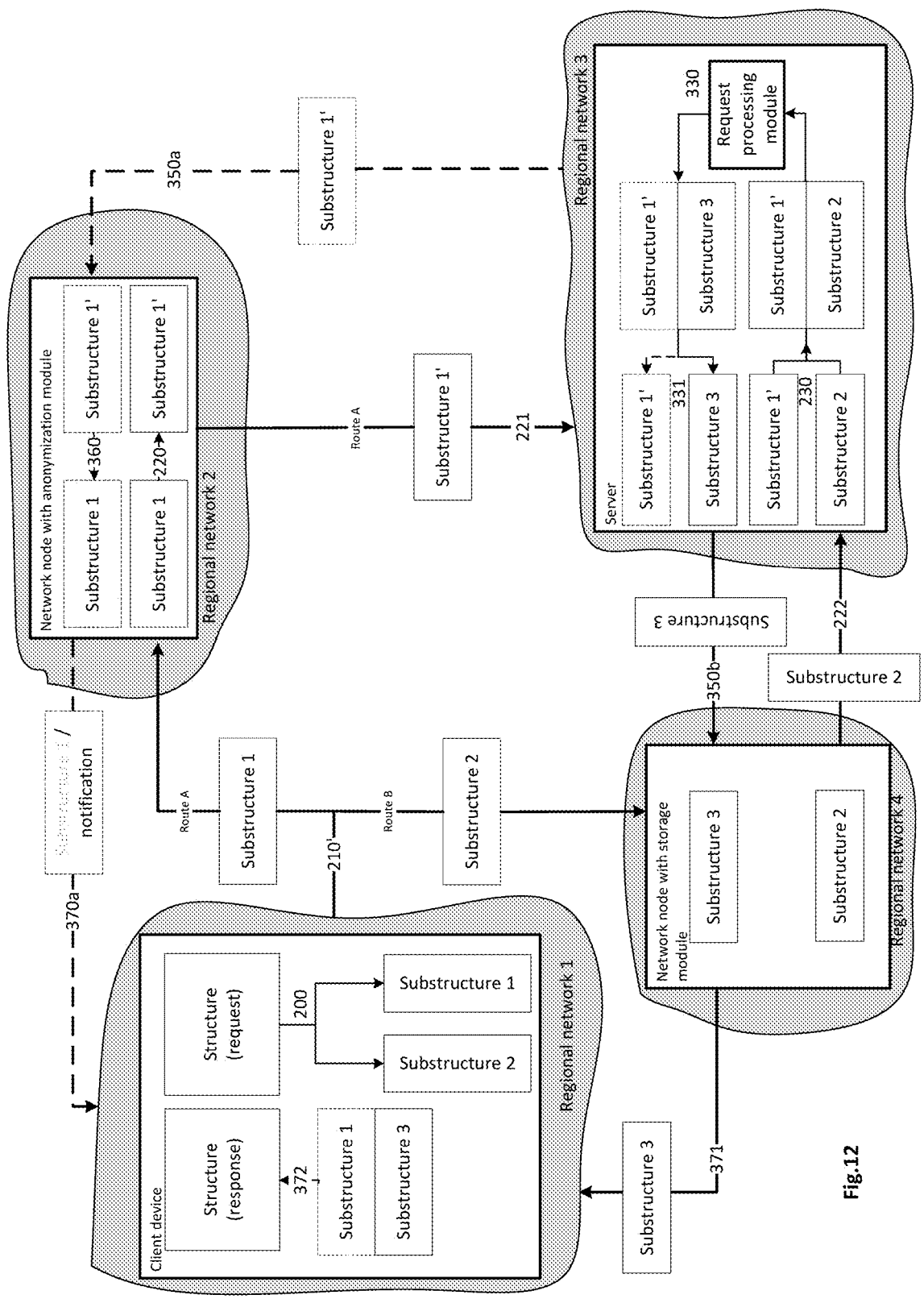
FIG. 12 illustrates a block diagram of a method for data exchange, which is used when executing a request of the client to the server, in accordance with aspects of the present disclosure.

FIG. 12 shows a method of data exchange which is used in a particular instance for executing a request of a client to the server. The steps 200, 221, 220, 230 are analogous to the steps shown in FIG. 2, the steps 210', 222 are analogous to the steps shown in FIG. 11, the step 330 is analogous to this same step in FIG. 3. Thus, the dispatching of a request to the server is analogous to the dispatching of data to the server for the construction of statistics, as shown in FIG. 11; the distinctions from all that was described above consist in how the response, prepared in step 330, is dispatched. The structure of the response to the request, generated in step 330, is broken up into at least two substructures in step 331: (1) one containing PD transformed by the anonymization module (substructure 1', extracted from the request structure); (2) one not containing PD (substructure 3, containing the body of the response to the request or the payload of the response).

In step 350a the substructure containing PD is dispatched from the server to the node with the anonymization module, where in step 360 a transformation will be performed which is the inverse of the transformation performed in step 220. The substructure not containing PD (in FIG. 12 substructure 3) is dispatched in step 350b to the network node with the storage module. Next, the substructure not containing PD will be sent to the client in step 371. Variants whereby the client receives the substructure in step 371 may be different. If step 350a is carried out, then after the transformation in step 360 the node with the anonymization module will dispatch a notification (message) to the client in step 370a that the response is ready; after this, the client will access the node with the storage module and will receive the substructure not containing PD from the node with the storage module. The notification in step 370a may contain, for example, a unique identifier assigned to the substructure 3 in the process of dividing the structure of the response to the request in step 331, the substructure with such an identifier being requested by the client from the network node with the storage module. In a particular instance, steps 350a, 360, 370a might not be performed. In this case, the identifier assigned to the substructures in the process of division in step 200 will be analogous to the identifier assigned in step 331 and the client in step 371 will obtain the substructure 3 by periodically polling the node with the storage module as to the arrival there of the substructure with the corresponding identifier. If steps 350a, 360, 370a are not performed, the structure of the response to the request is identical to the substructure not containing PD (substructure 3), to which a unique identifier is assigned. In another particular instance, the node with the storage module independently dispatches the substructure 3 to the client in step 371; in this case, the session identifier is used, which was established between the client and the node with the storage module to carry out step 210; in the given case, the unique identifier assigned to the substructures in steps 200 and 331 are equal and they are equal to the session identifier. In this case, when the node receives the substructure 3 in step 350b, it will read the identifier of substructure 3 and forward it to the client whose session has the same identifier; the primary condition for the performance of this variant is the maintaining of the session between client and node with the storage module until the end of the data exchange between the client and the server when executing the request and dispatching the response.

Figure 12A:
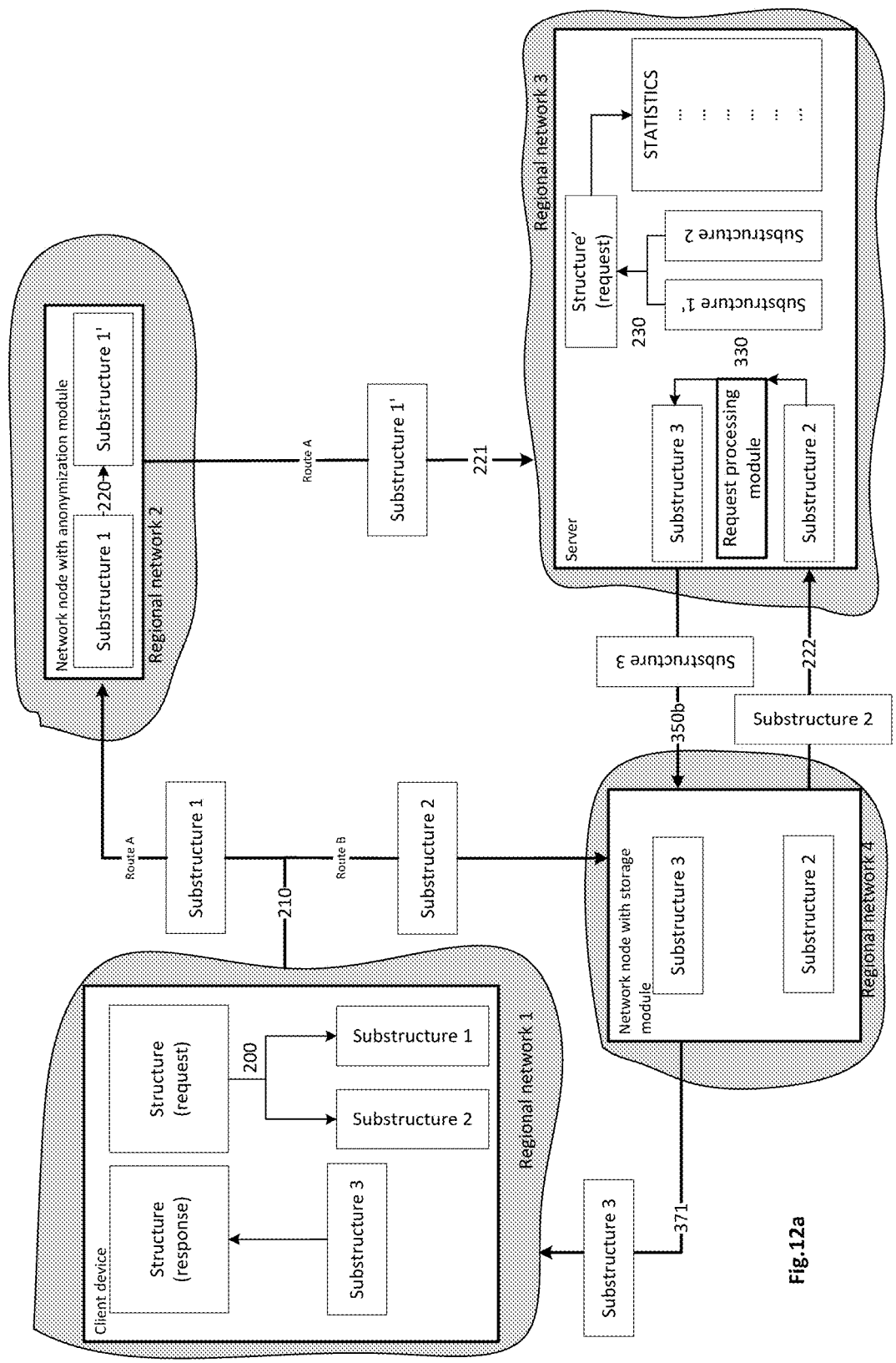
FIG. 12a illustrates a block diagram of a variant method for data exchange, which is used when executing a request of the client to the server, in accordance with aspects of the present disclosure.

In a particular instance, the scheme described in FIG. 12 may operate in an asynchronous mode; in this case, step 330 is carried out without performing step 230, the data of substructure 2 is used, and the obtained substructure 3, omitting step 331, is dispatched to the node with the storage module (step 350b). Step 230 will be performed independently of step 330. Such a mode increases the speed of the server's response and is used in the event that only the data contained in the substructure not containing CD is needed for the processing of the request. A combining of the substructures (step 230) in such cases is only necessary to construct statistics, as in the example shown in FIG. 12a.

Figure 13:
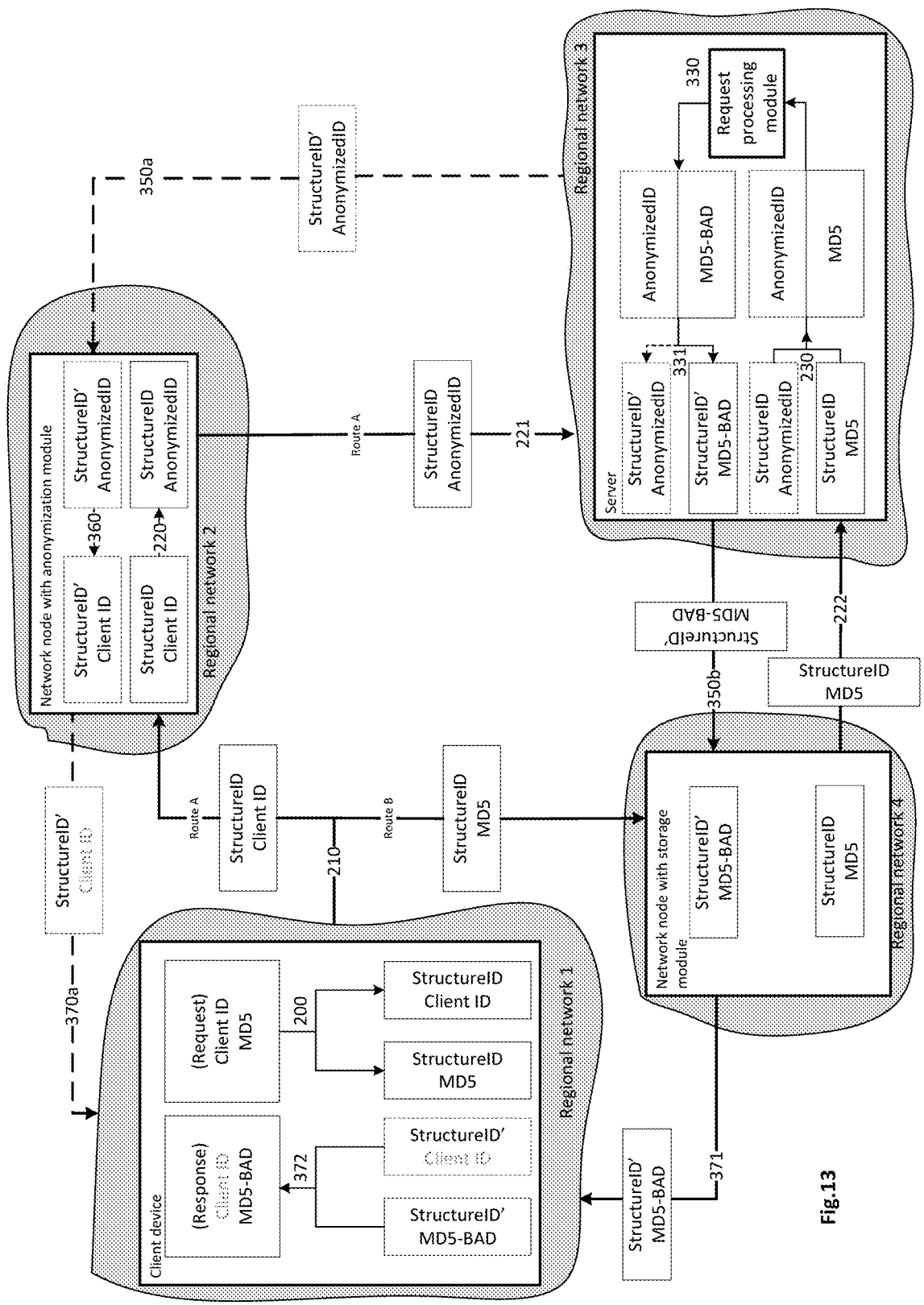
FIG. 13 illustrates a block diagram of a method for data exchange, when executing a request of the client to the server, in accordance with aspects of the present disclosure.
Figure 13A:
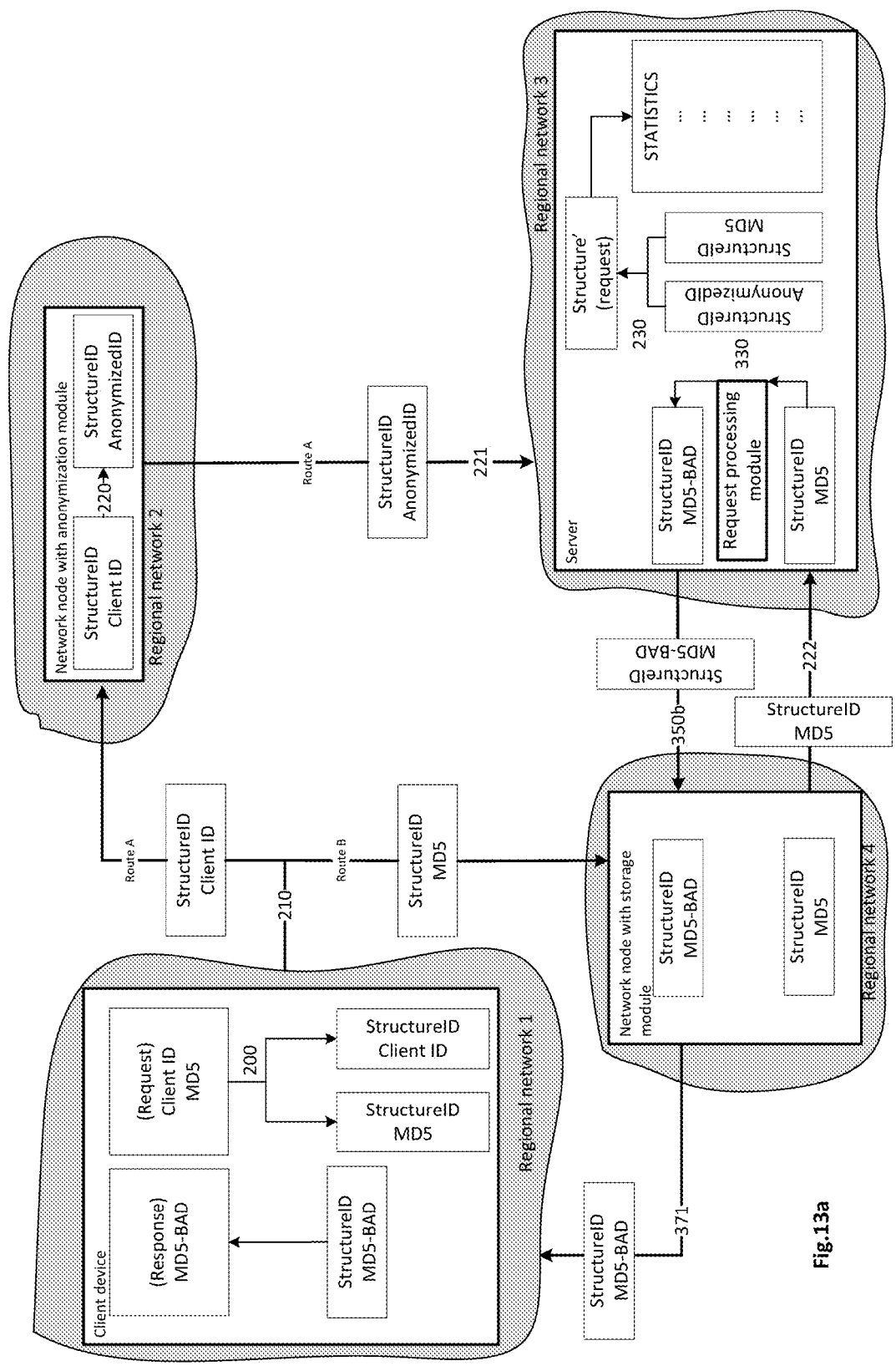
FIG. 13a illustrates a block diagram of a method for data exchange, when executing a request of the client to the server in asynchronous mode, in accordance with aspects of the present disclosure.

FIG. 13 shows an example of the use of the method illustrated in FIG. 12 in order to obtain a verdict (dangerous/malicious or safe) for a file detected on the client side from the server. For the sending to the server of information about the detected file (in the present example, the information about the file is the MD5 of the file), a data structure is generated which includes the client ID and the MD5 of the detected file. In step 200 the modification module divides the generated structure, intended for sending to the server, into substructures, obtaining as a result of the division a substructure containing the client ID and a substructure containing the MD5 of the file; in order to know the structure to which the substructures pertain, they are assigned an identifier (in the figure the identifier is denoted as StructureID). In step 210 the modification module of the client dispatches the obtained substructures. The dispatching is done by different routes (route A and route B) and to different recipients. By route A the substructure is dispatched to the server, route A including the network node with the anonymization module, situated in a regional network different from the network where the server is located, and not being in the same intranet with the server or the client. The substructure containing the client ID is sent to the server via the node with the anonymization module (route A). By route B the substructure is dispatched to the network node with the storage module, situated in a regional network different from the network where the server is located, and not being in the same intranet with the server or the client. The substructure containing the MD5 of the file is sent to the network node with the storage module (route B). In step 220 the anonymization module carries out a transformation of the client ID, where the client ID is saved at the node, and it replaces this in the substructure with the token AnonymizedID (in a particular instance, the Client ID may be encrypted). The obtained substructure is dispatched to the server (step 221). In step 222 the substructure with the MD5 of the file will be received by the server. If the method is carried out in synchronous mode, then in step 230 the substructures obtained by the server in step 221 and step 222 will be combined and the request will be processed in step 330. In our example, the MD5 will be scanned against a database of malicious and safe files and the results of the scan will be used to produce a verdict and generate a response to the request (in the given example, the file proved to be malicious—MD5-BAD). The generated response to the request is divided in step 331 into two substructures, as a result of the division one obtains a substructure containing the client ID and a substructure containing the verdict (MD5), in order to know the structure to which the substructures pertain, they are assigned an identifier (which identifier is denoted in the figure as StructureID); in a particular instance, the identifier may be identical to the identifier assigned to the substructures in step 200. In step 350*b* the substructure with the verdict is dispatched to the network node with the storage module, which either forwards the substructure to the client in step 371 (if StructureID corresponds to the session ID between the node and the client established in step 210), or it is saved until needed. This substructure may be needed by the client in event of receiving a notification from the node with the anonymization module obtained by the client as a result of the execution of steps 350*a*, 360, 370*a*. Or the client constantly polls the network node with the storage module as to the presence of the response substructure at the node (in this case, the StructureID assigned to the substructures in steps 200 and 331 should be identical). In step 372 the client processes the response. If the method is carried out in asynchronous mode (FIG. 13*a*), then step 230 and step 330 are performed independently, the StructureID in step 330 does not change and is identical to the StructureID in step 200, and in a particular instance is equal to the session ID between the client and the node with the storage module of step 210, in which context a transmission of the substructure will also take place in step 371.

The claimed disclosure makes it possible to decentralize the data coming from a client, which provides anonymity for the user whose device is the client; the data being exchanged by the client with the server cannot be associated with the client upon accessing the server. Some of the data is known only to the server, some only to the network node with the anonymization module, and the data cannot be de-anonymized without simultaneous access to these system components, while the impossibility of a simultaneous access to the components, including by government structures, is assured by distributing the system components among different regional networks, differing both in geographical respect and in respect of territorial jurisdiction. The claimed disclosure when utilizing the node with the storage module also allows hiding the external IP address of the client from the server (the server does not pick up the substructure directly from the client, but instead via the node with the storage module), and also reduces the burden on the node with the anonymization module.

In certain cases, after the data structure has been divided into two data substructures, one of which comprises confidential data, it becomes necessary to further divide the given substructure. This is done, in one particular instance, when the data are critical only when found together, e.g., the IP address and the time stamp are together personal data; having divided the substructure in which this linkage is found into a substructure with the IP address and a substructure with the time stamp, the data lose their personal attribute and may be processed by the node, not having the ability to combine these structures, with no restrictions placed by legislation on the processing of critical (in the given case, personal) data. But in such a case the mechanism of sending the data to the server is more complex.

Figure 14:
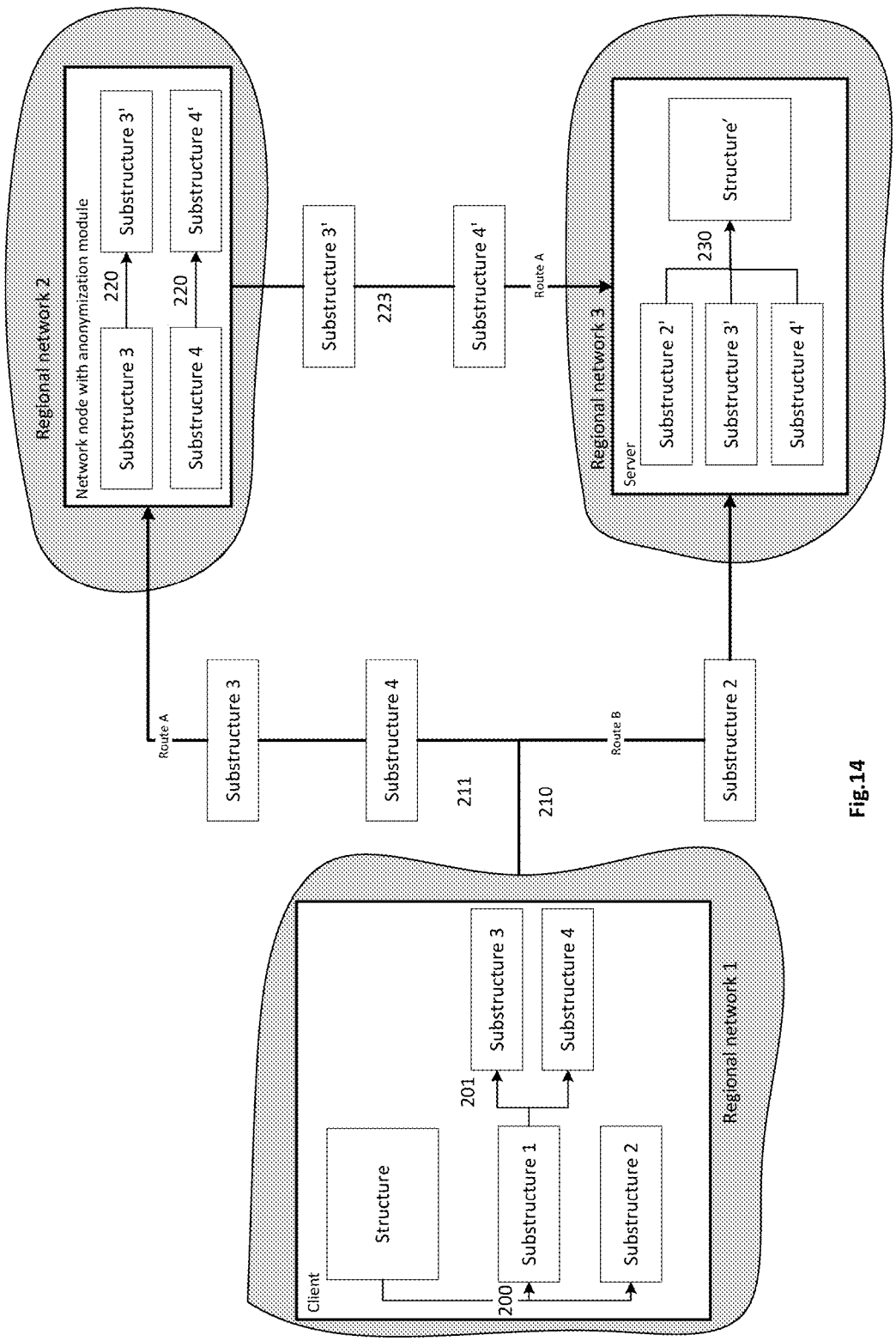
FIG. 14 illustrates a block diagram of a method for sending critical data in a client-server architecture, in accordance with aspects of the present disclosure.

FIG. 14 shows a method of sending critical data in a client-server architecture which is used in a particular instance for obtaining data from clients for the construction of statistics. In step 200, the modification module divides up the structure intended for sending to the server in accordance with criteria, one such criterion possibly being the presence of critical (e.g., confidential, including personal) data in the structure; as a result of the dividing up, there are obtained a substructure containing critical data (this being substructure 1 for the example in FIG. 14) and a substructure not containing such data (this being substructure 2, correspondingly, in FIG. 14). In step 201, the modification module additionally divides up the substructure containing critical data into at least two substructures (this being substructure 3 and substructure 4 for the example in FIG. 14). In step 210, the modification module sends substructure 2 to the server by route B. In step 211, the substructures obtained during the dividing up of the substructure containing critical data are sent in succession by another route, different from route B, where the alternative route includes a network node with a transformation module (this is route A in the example of FIG. 14), and being located in a particular instance in a regional network different from the network where the server is located and not being in the same intranet with the server or the client. Next, in step 220 the substructures passing through the node with the transformation module are transformed by that means and sent onward to the server (step 223) in transformed form. In the general case, the substructures from the same client are transformed differently at different moments of time (for example, Client ID->AnonymizedID1≠AnonymizedID2≠AnonymizedID3 and so forth); this applies to all examples, but in a particular instance the transformation will be identical (e.g., Client ID->AnonymizedID1=AnonymizedID2=AnonymizedID3 and so forth) when for certain security systems it is necessary to gather information (construct statistics) on a particular client for a substructure from the same client. Finally, in step 230, the substructures obtained from the client are combined into a structure (Structure'). Obviously, the resulting structure (Structure') is different from the original one, since at least two substructures have been transformed by the anonymization module. The resulting structure in the database will also be used by an infrastructure module (e.g., request processing module or attack detection module) on the server side, for example to construct a profile. The transformation of the substructures and/or the data of the substructures by the transformation module is done by a method precluding the possibility of an inverse transformation of the substructures and/or the data of the substructures by any means other than the means of the network node with the transformation module.

Figure 14A:
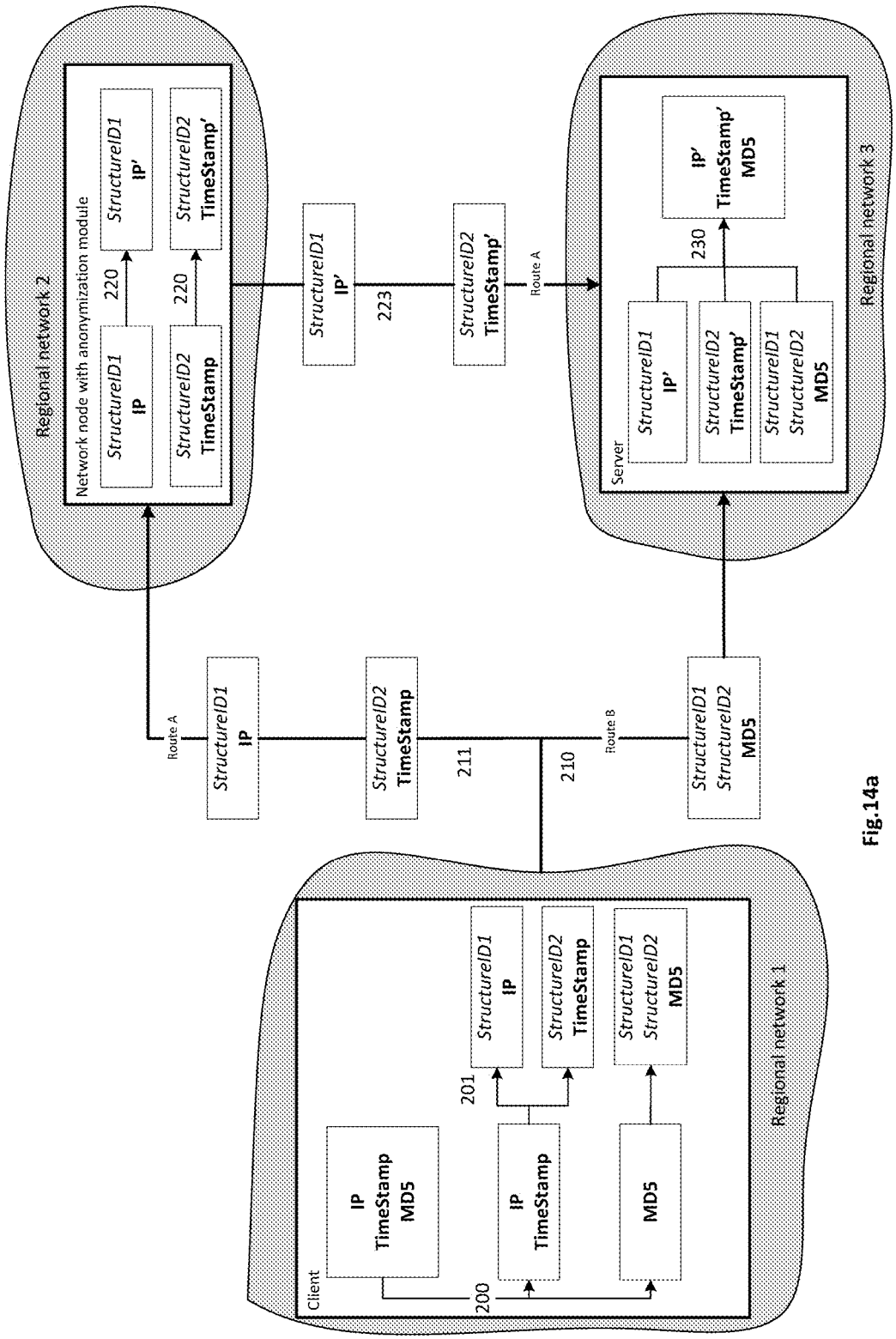
FIG. 14a illustrates a block diagram of a method for sending critical data in a client-server architecture, in accordance with aspects of the present disclosure.

FIG. 14*a* shows an example of the implementation of the method of sending critical data. On the client side, a structure is generated for sending to a server, the structure comprises the IP address of the client, a time stamp (TimeStamp) and the MD5 of a certain file. In step 200, the modification module divides up the structure intended for sending to the server, as a result of the dividing there are obtained: a substructure containing the IP address and the time stamp, and a substructure containing the MD5 of the file. In step 201, the modification module further divides up the substructure containing the IP address and the time stamp into two substructures (in FIG. 14*a* this is the substructure with the IP address and the substructure with the time stamp). In order to know which substructure containing the MD5 is related to the IP substructure and the TimeStamp substructure, they are assigned identifiers (in the figure, the identifiers are denoted as StructureID1, StructureID2) and these same identifiers are placed in the MD5 substructure. In step 210, the modification module sends the substructure with the MD5 to the server by route B, and in step 211 it sends consecutively the substructure with the IP address and the substructure with the time stamp by another route, different from route B, where the alternative route includes a network node with a transformation module (in the example of FIG. 14*a* this is route A), where the node with the transformation module is located in a particular instance in a regional network different from the network in which the server is located, and not being in the same intranet as the server or the client. Then, in step 220, the substructure with the IP address and the substructure with the time stamp are transformed and sent onward to the server (step 223) in transformed form. The transformation is done as the substructures are received. In conclusion, in step 230, the substructures received from the client are combined into a structure containing the transformed IP address, the transformed time stamp, and the MD5.

In the general case, there may be more than one network node with transformation module (in a particular instance, anonymization module). This is due to the fact that the data substructures into which the structure is divided may have different values, different degrees of confidentiality and sizes. For example, one node processes data of insignificant size, having the highest degree of confidentiality, such as identifiers or special categories of personal data, while another node processes a large volume of data, yet having a low degree of confidentiality, such as absolute network addresses in which personal data may be found, and the task of this node is to extract or transform this data. The use of more than one network node with a transformation module is also occasioned by the flexibility of the working of the routing system shown in FIG. 15*a*, where the choice of the node with the transformation module is determined as well by the location of the client (in a particular instance, a regional network), that of the destination server, and the requirements of local legislation; for example, if the client is dispatching data from the Russian Federation, the system will select a node with the transformation module located in the USA, and if the data are being dispatched from the USA it will select a node with a transformation module in Switzerland.

Figure 15A:
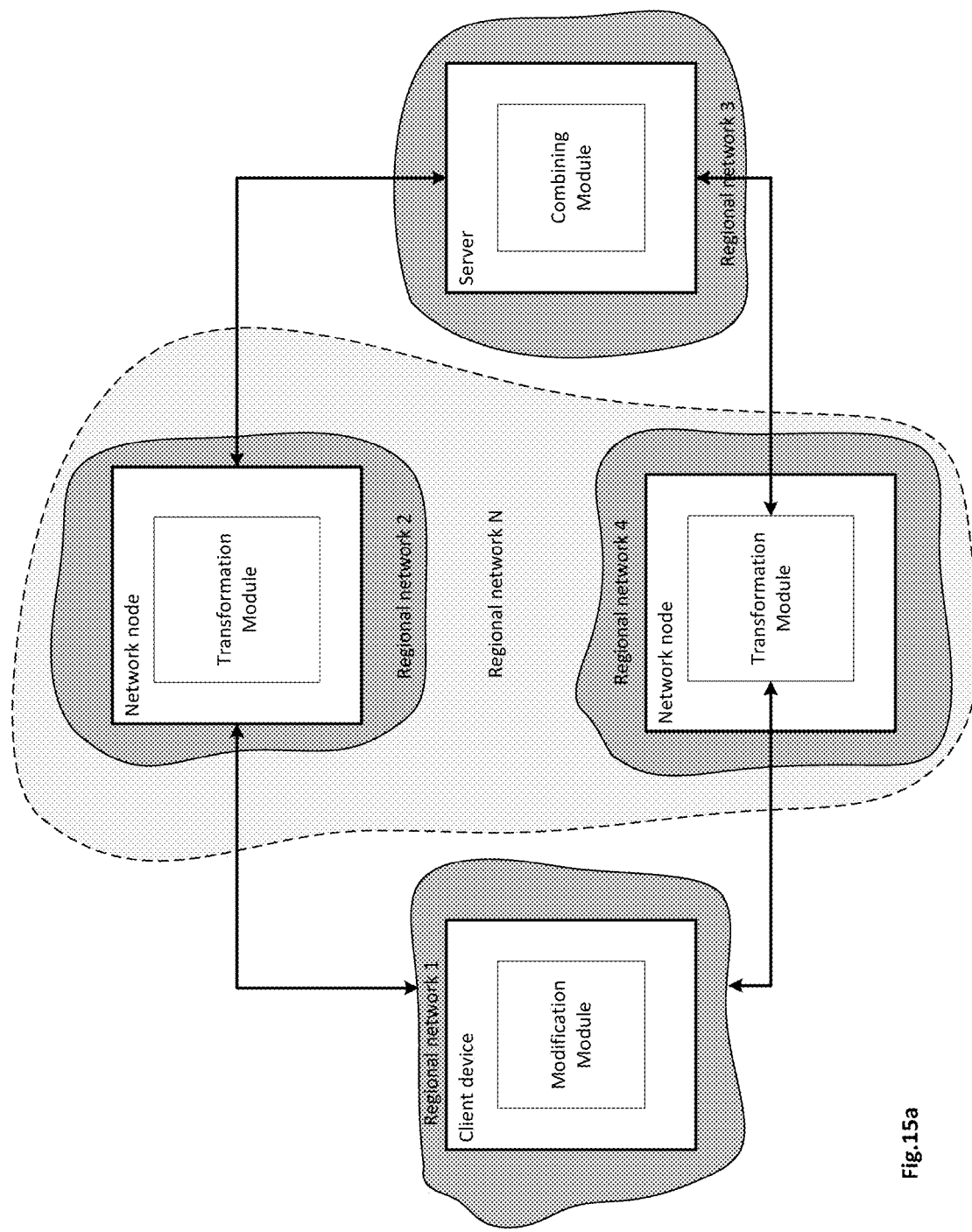
FIG. 15a illustrates a block diagram of a routing system, in accordance with aspects of the present disclosure.
Figure 15B:
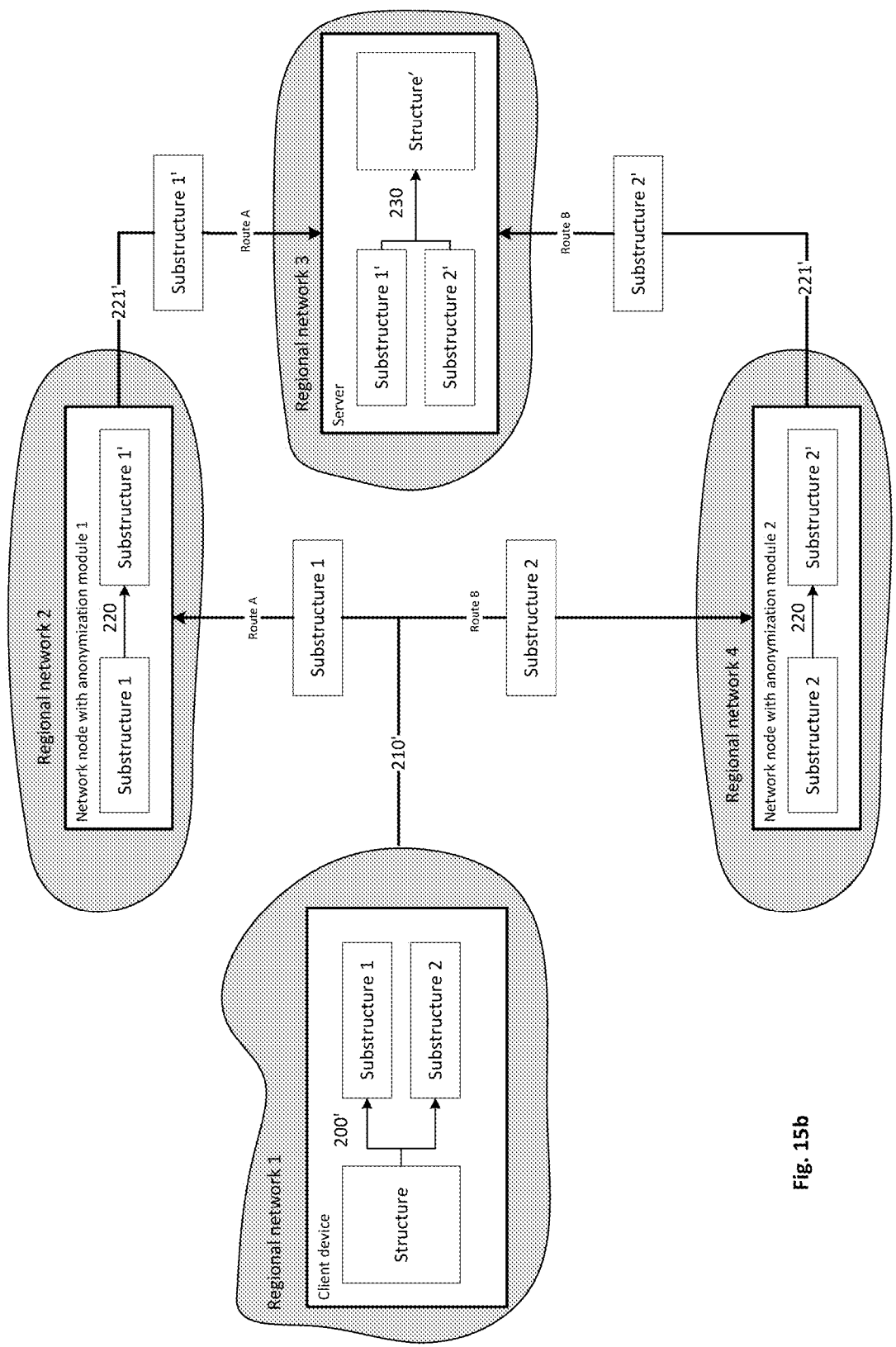
FIG. 15b illustrates a block diagram of a method for adaptive selection of data transmission routes from client to server, in accordance with aspects of the present disclosure.

The routing system illustrated in FIG. 15*a* is used to carry out a method of adaptive selection of data transmission routes from client to server (FIG. 15*b*). In step 200' the data intended for dispatching are broken up into substructures depending on their criticality and the substructures are assigned a degree of confidentiality. The dividing up of the data may be done by any method known from the prior art, including the methods of natural language processing, clustering, and the division may also be done on the basis of the source (applications, documents, information from the system, etc.), the type of data (search queries, absolute network addresses, convolutions of HTML documents, commentaries, responses), and the area of knowledge about the user (for example, the location of a purchase is extracted from information about the actual purchase). If the division is done on the basis of the type of data or the source, the substructure inherits the degree of confidentiality of the source or type of data which it is assigned during the preparation of the specifications for the data being collected. The division by the modification module may also be done on the basis of an area of knowledge—attributes and characteristics describing the user, for example, it is necessary to send information about the location of acquisition of a commodity and about the commodity acquired, so as a result of the division one substructure will contain data about the location of the acquisition, another substructure about the commodity acquired, and a third structure the identifier of the purchaser. A division by areas of knowledge is possible, for example, with the use of clustering models; the clustering model is trained so that each cluster comprises the maximum information about a given area of knowledge about the user, yet minimal information about other areas of knowledge about the user which are specified for other substructures. For the resulting substructures, routes are selected in step 210' by which the substructures will be forwarded to the server. The route is determined by the degree of confidentiality which is assigned to the substructure. The chosen route should contain a node with a transformation module which is able to provide information security for the substructure passing through it, the security of the node being determined by the degree of security, and the node on the chosen route should have a degree of security not less than that required for the given degree of confidentiality of the substructure. If the degree of security of the server corresponds to the required one, the substructure is dispatched to the server bypassing additional nodes with a transformation module. The degree of confidentiality represents a numerical value, which characterizes the probability that it is possible to determine the user from said data, while the degree of security represents a numerical value characterizing the probability that said server is able to provide information security for the received data substructure, the choice of the node being determined on the basis of the degree of confidentiality of the substructure and the degree of security of the node with the transformation module.

Having chosen a route, the substructures are dispatched and transformed at the nodes with the transformation module (step 220), the transformations being done by the methods described above. After the transformation, the substructures are dispatched in step 221' to the server and in step 230 they are combined. The combined substructures may be used to form anonymous and protected user profiles.

Figure 15C:
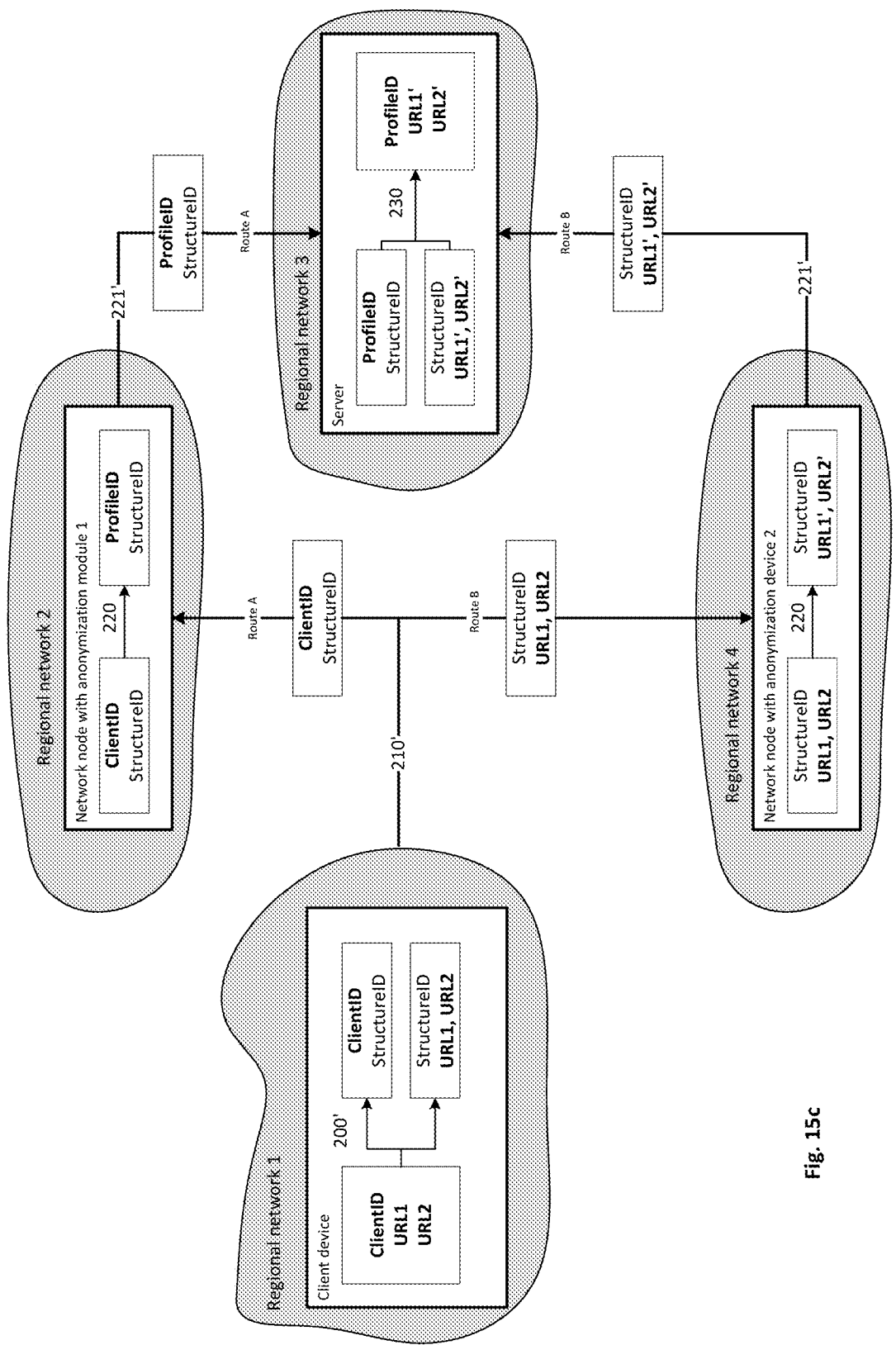
FIG. 15c illustrates a block diagram of a method for adaptive selection of the route of the adaptive selection of data transmission route from client to server, in accordance with aspects of the present disclosure.

FIG. 15*c* shows an example of the carrying out of the method for adaptive selection of the route of an adaptive selection of routes for sending data from a client to a server. At the client side, a data structure is formed for the dispatch, containing the ClientID—Ivan1234 and several network addresses visited by the user:

https://vk.com/ivan_ivanov/video?q=UFC
https://octagon-shop.com/ivan_ivanov/napravleniya-sporta/mix_fight/perchatki_dlya_mma/

Next, in step 200', the data structure is broken up into two substructures on the basis of the degrees of confidentiality, where for example a degree of confidentiality of 10 (the highest) is established by default for the identifiers, and a degree of confidentiality of 5 for the network addresses, these degrees being indicated in the configuration file of the modification module and being used by the modification module during the dividing up into substructures. As a result, one obtains two substructures, one of which comprises the identifier, and the other comprises the network addresses. In step 210' there is a selection of routes, on the basis of the degree of confidentiality of the data in the substructures and the degrees of security of the accessed nodes with the transformation module. The node with the transformation module on route A has a degree of security of 10, while the node with the transformation module on route B has a degree of security of 6; since it was pointed out above that the degree of security of the node should not be less than the degree of confidentiality of the data, route A will be chosen for the dispatching of the substructure with the identifier, and route B will be chosen for dispatching the substructure with the network addresses. In step 220, the data are transformed. On route A, the identifier in the substructure is encrypted by the transformation module of the node and becomes Ivan1234->416b69ce0b706e26442e41ca51fff5ec, corresponding to the ProfileID at the server. On route B, the network addresses in the substructure are anonymized by the transformation module of the node:

https://vk.com/FFFFFF/video?q=UFC
https://octagon-shop.com/FFFFFF/napravleniya-sporta/mix_fight/perchatki_dlya_mma/

The transformed data in step 221' is sent on to the server, where in step 230 it is combined and added to other data from the profile with the identifier 416b69ce0b706e26442e41ca51fff5ec.

By the modification module, the anonymization module, the combining module, the request processing module, the attack detection module, and the storage module are meant in the present disclosure real-world devices, systems, components, groups of components, realized with the use of hardware such as integrated microcircuits (application-specific integrated circuit, ASIC) or a field-programmable gate array (FPGA) or for example in the form of a combination of software and hardware, such as a microprocessor system and a set of program instructions, and also on the basis of neuromorphic chips. The functionality of said means may be realized solely by hardware, and also in the form of a combination, where some of the functionality is realized by software and some by hardware. In certain variant embodiments the means may be executed on the processor of a general-purpose computer (such as the one shown in FIG. 16). The databases may be realized by every possible method and may be contained either on a single physical medium or on different ones, both local and remote.

FIG. 15c illustrates an example of carrying out the method for adaptive selection of routes for data transmission from client to server. At the client side, a data structure is formed for the dispatch, containing the ClientID—Ivan1234 and several network addresses visited by the user:
https://vk.com/ivan_ivanov/video?q=UFC
https://octagon-shop.com/ivan_ivanov/napravleniya-sporta/mix_fight/perchatki_dlya_mma/

Next, in step 200', the data structure is broken up into two substructures on the basis of the degrees of confidentiality, where for example a degree of confidentiality of 10 (the highest) is established by default for the identifiers, and a degree of confidentiality of 5 is established for the network addresses. These degrees are indicated in the configuration file of the modification module and used by the clustering model during the dividing up into substructures.

Figure 16:
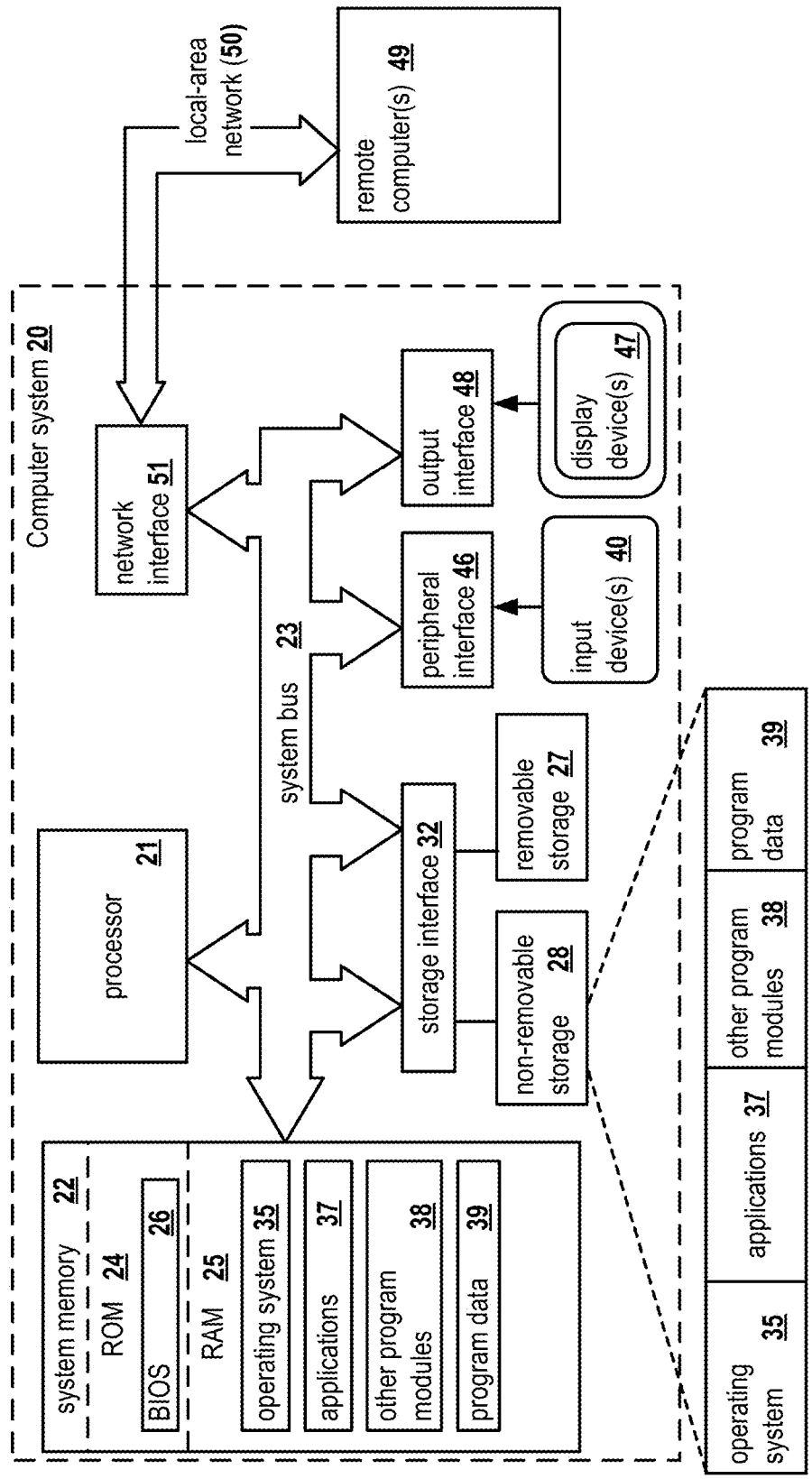
FIG. 16 presents an example of a general-purpose computer system on which aspects of the present disclosure can be implemented.

FIG. 16 is a block diagram illustrating a computer system 20 on which aspects of systems and methods for sending user data in a client-server architecture with data anonymity and consistency may be implemented in accordance with an exemplary aspect. The computer system 20 may represent the client device(s), network node(s) and server(s) depicted in any of the figures of the present application and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet.

Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for anonymously routing user data from a client device to a server, the method comprising:
   identifying, a structure to send to the server, wherein the structure comprises the user data;
   dividing the structure into two or more respective substructures using a clustering model that indicates potential divisions of user data in the structure based on different areas of knowledge about a user of the client device, wherein each of the respective substructures comprises information on a given area of knowledge about the user; and
   for each respective substructure:
      assigning a degree of confidentiality to the respective substructure;
      identifying a plurality of nodes between the client device and the server, wherein different nodes have different degrees of security; and
      sending the respective substructure to the server via a respective node of a plurality of nodes based on the assigned degree of confidentiality of the substructure and a matching degree of security of the respective node, wherein the respective node is configured to (1) apply a respective transformation to the respective substructure and (2) transmit the transformed respective substructure to the server, wherein the server is configured to combine received transformed substructures into a transformed structure.

2. The method of claim 1, wherein a first substructure of the two or more respective substructures further comprises information about at least one other substructure of the two or more respective substructures.

3. The method of claim 1, further comprising:
   training the clustering model to output clusters of substructures such that the cluster model, for a given cluster, maximizes a first amount of information about the given area of knowledge about the user and minimizes a second amount of information about other areas of knowledge about the user which are comprised in other substructures of the structure.

4. The method of claim 1, wherein the plurality of nodes further comprises the server, and wherein the server is further configured to apply a transformation to the received transformed substructures.

5. The method of claim 1, wherein the plurality of nodes comprises at least one node configured to apply a transformation that transforms the respective substructure such that it is possible to identify a user of the user data from the transformed respective substructure, but it is not possible to retrieve additional data of the user data from the transformed respective sub structure.

6. The method of claim 1, wherein the plurality of nodes comprises a first node and a second node, and wherein parameters of a first transformation applied by the first node depend on parameters of a second transformation previously applied by the second node.

7. The method of claim 1, wherein the degree of confidentiality represents a numerical value characterizing a probability of identifying a user of the client device from the respective substructure.

8. The method of claim 1, further comprising:
determining the degree of security for the respective node, wherein the degree of security represents a numerical value characterizing a probability that the respective node is able to provide information security for the respective substructure.

9. The method of claim 1, further comprising determining the degree of confidentiality based on a location of the client device.

10. The method of claim 1, further comprising sending the respective substructure to the respective node based on the location of the client device.

11. The method of claim 1, wherein the transformed structure is used to form protected user profiles.

12. The method of claim 1, in which the protected user profiles represent a functionally interrelated aggregate of the received transformed substructures for a user of the client device.

13. A system for anonymously routing user data from a client device to a server, the system comprising a hardware processor of the client device configured to:
identify, a structure to send to the server, wherein the structure comprises the user data;
divide the structure into two or more respective substructures using a clustering model that indicates potential divisions of user data in the structure based on different areas of knowledge about a user of the client device, wherein each of the respective substructures comprises information on a given area of knowledge about the user; and
for each respective substructure:
assign a degree of confidentiality to the respective substructure;
identify a plurality of nodes between the client device and the server, wherein different nodes have different degrees of security; and
send the respective substructure to the server via a respective node of a plurality of nodes based on the assigned degree of confidentiality of the substructure and a matching degree of security of the respective node, wherein the respective node is configured to (1) apply a respective transformation to the respective substructure and (2) transmit the transformed respective substructure to the server, wherein the server is configured to combine received transformed substructures into a transformed structure.

14. The system of claim 13, wherein a first substructure of the two or more respective substructures further comprises information about at least one other substructure of the two or more substructures.

15. The system of claim 13, wherein the hardware processor is further configured to:
train the clustering model to output clusters of substructures such that the cluster model, for a given cluster, maximizes a first amount of information about the given area of knowledge about the user and minimizes a second amount of information about other areas of knowledge about the user which are comprised in other substructures of the structure.

16. A non-transitory computer readable medium storing thereon computer executable instructions for anonymously routing user data from a client device to a server, comprising instructions for:
identifying, a structure to send to the server, wherein the structure comprises the user data;
dividing the structure into two or more respective substructures using a clustering model that indicates potential divisions of user data in the structure based on different areas of knowledge about a user of the client device, wherein each of the respective substructures comprises information on a given area of knowledge about the user; and
for each respective substructure:
assigning a degree of confidentiality to the respective substructure;
identifying a plurality of nodes between the client device and the server, wherein different nodes have different degrees of security; and
sending the respective substructure to the server via a respective node of a plurality of nodes based on the assigned degree of confidentiality of the substructure and a degree of security of the respective node, wherein the respective node is configured to (1) apply a respective transformation to the respective substructure and (2) transmit the transformed respective substructure to the server, wherein the server is configured to combine received transformed substructures into a transformed structure.

* * * * *